(12) United States Patent
Byron et al.

(10) Patent No.: US 8,113,759 B1
(45) Date of Patent: Feb. 14, 2012

(54) CONTAINER CONTENTS DISCHARGING STATION ASSEMBLY WITH SEALING GUARD LIP AND LOADING GUIDE SHOULDERS

(75) Inventors: Stephen Byron, San Antonio, TX (US); Jimmie Lassitar, Jr., San Antonio, TX (US); John Pfullmann, San Antonio, TX (US)

(73) Assignee: Meyer Industries, Inc., San Antonio, TX (US)

( * ) Notice: Subject to any disclaimer, the term of this patent is extended or adjusted under 35 U.S.C. 154(b) by 1003 days.

(21) Appl. No.: 11/731,375

(22) Filed: Mar. 30, 2007

Related U.S. Application Data

(60) Provisional application No. 60/788,273, filed on Mar. 30, 2006.

(51) Int. Cl.
*B65G 65/23* (2006.01)
(52) U.S. Cl. .......................... 414/419; 414/425; 414/758
(58) Field of Classification Search .................. 414/419, 414/425, 758
See application file for complete search history.

(56) References Cited

U.S. PATENT DOCUMENTS

| | | | | |
|---|---|---|---|---|
| 1,486,609 A * | 3/1924 | Schwab | ......................... | 414/758 |
| 3,279,635 A * | 10/1966 | Avery et al. | .................... | 414/420 |
| 4,348,147 A * | 9/1982 | Helm | ............................ | 414/420 |
| 5,488,882 A * | 2/1996 | Riemersma et al. | .......... | 74/577 S |
| 5,743,374 A * | 4/1998 | Monsees | ....................... | 198/403 |
| 5,934,414 A * | 8/1999 | Staczek | ......................... | 187/269 |
| 6,565,308 B2 * | 5/2003 | Derby et al. | ................... | 414/583 |
| 6,651,673 B2 * | 11/2003 | Heitmann | ....................... | 131/96 |
| 7,018,163 B2 * | 3/2006 | Beavers et al. | ............... | 414/772 |
| 7,462,012 B2 * | 12/2008 | Hart et al. | ................... | 414/790.9 |

* cited by examiner

*Primary Examiner* — Scott Lowe
(74) *Attorney, Agent, or Firm* — Thomas E. Sisson, PLLC

(57) ABSTRACT

A container-contents discharging station may include a guard in sealing engagement with a container prior to inverting the container to discharge its contents. A container-contents discharging station may also include an air bellows to seal an open top of a container to a guard prior to inverting the container to discharge its contents. A method for retrofitting an existing container-contents discharging system removes an existing enclosure and replaces it with a modified enclosure having a sealing guard and a container lifting mechanism.

1 Claim, 18 Drawing Sheets

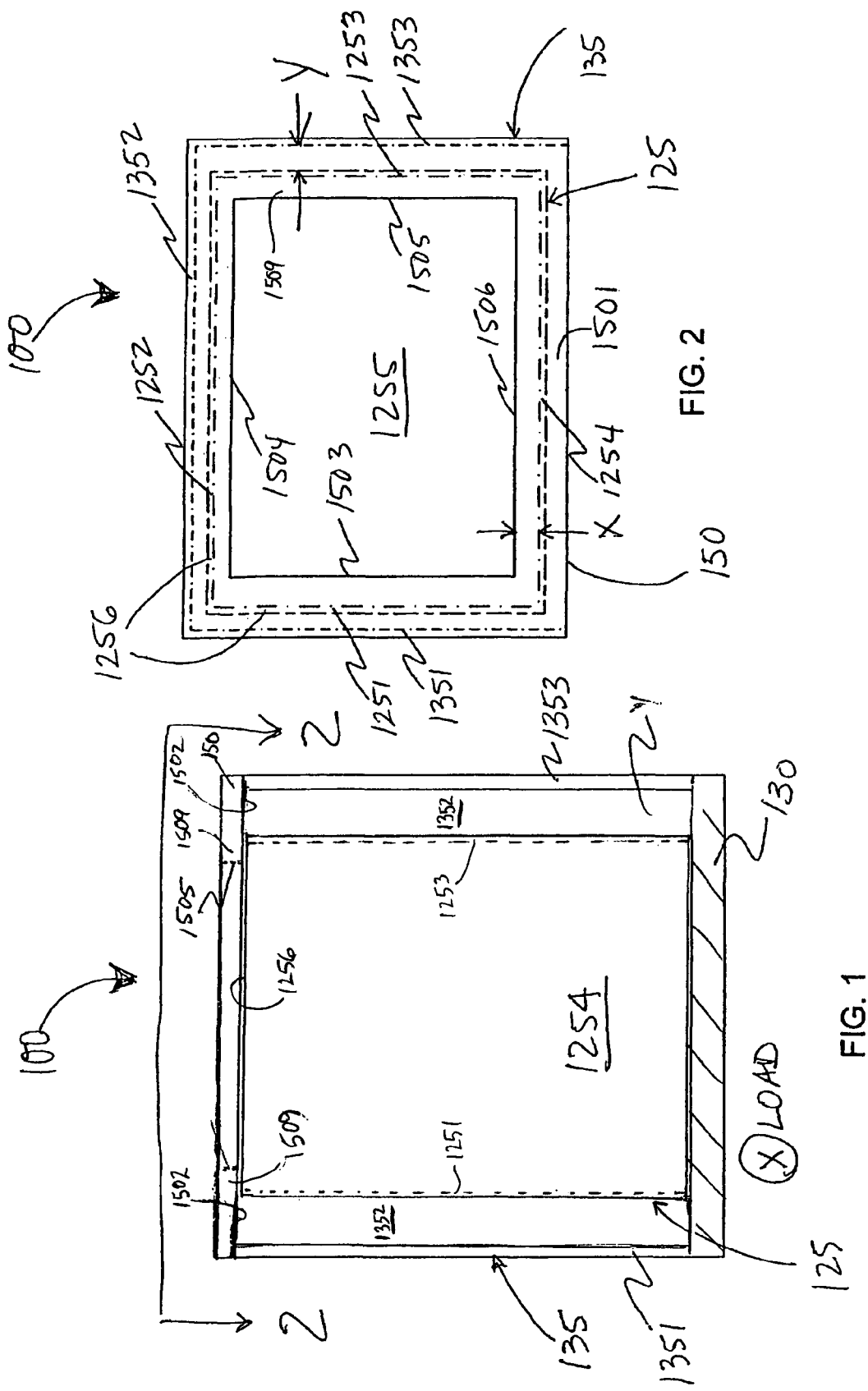

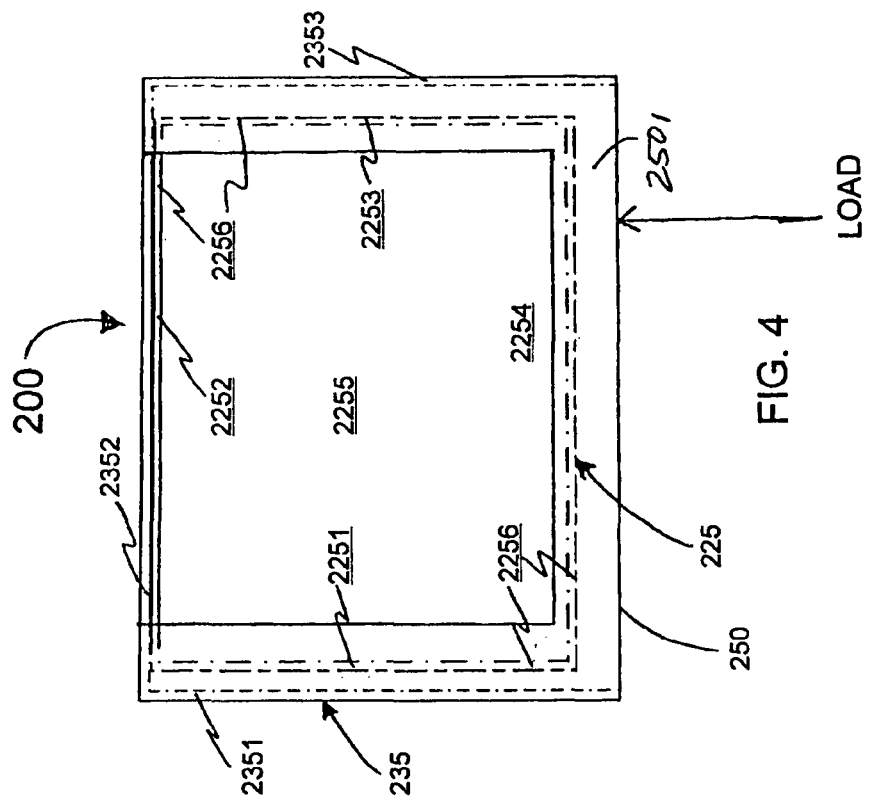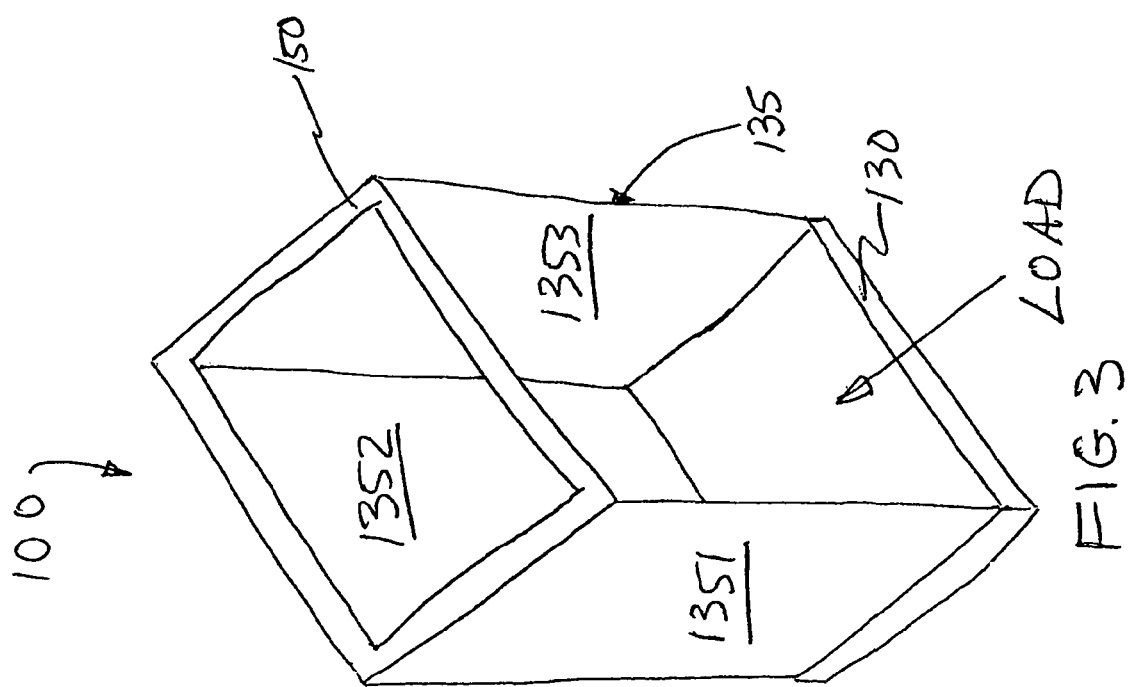

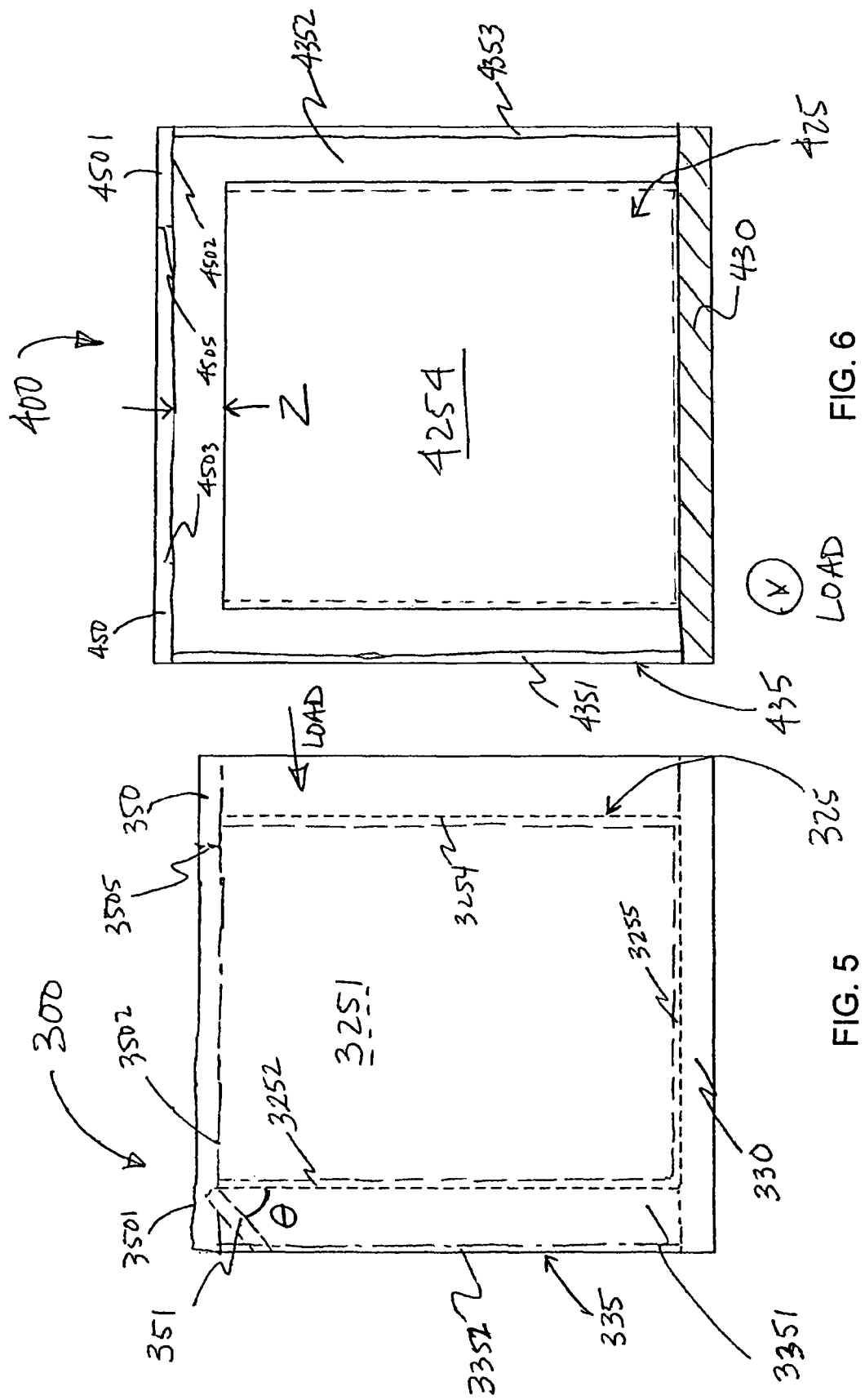

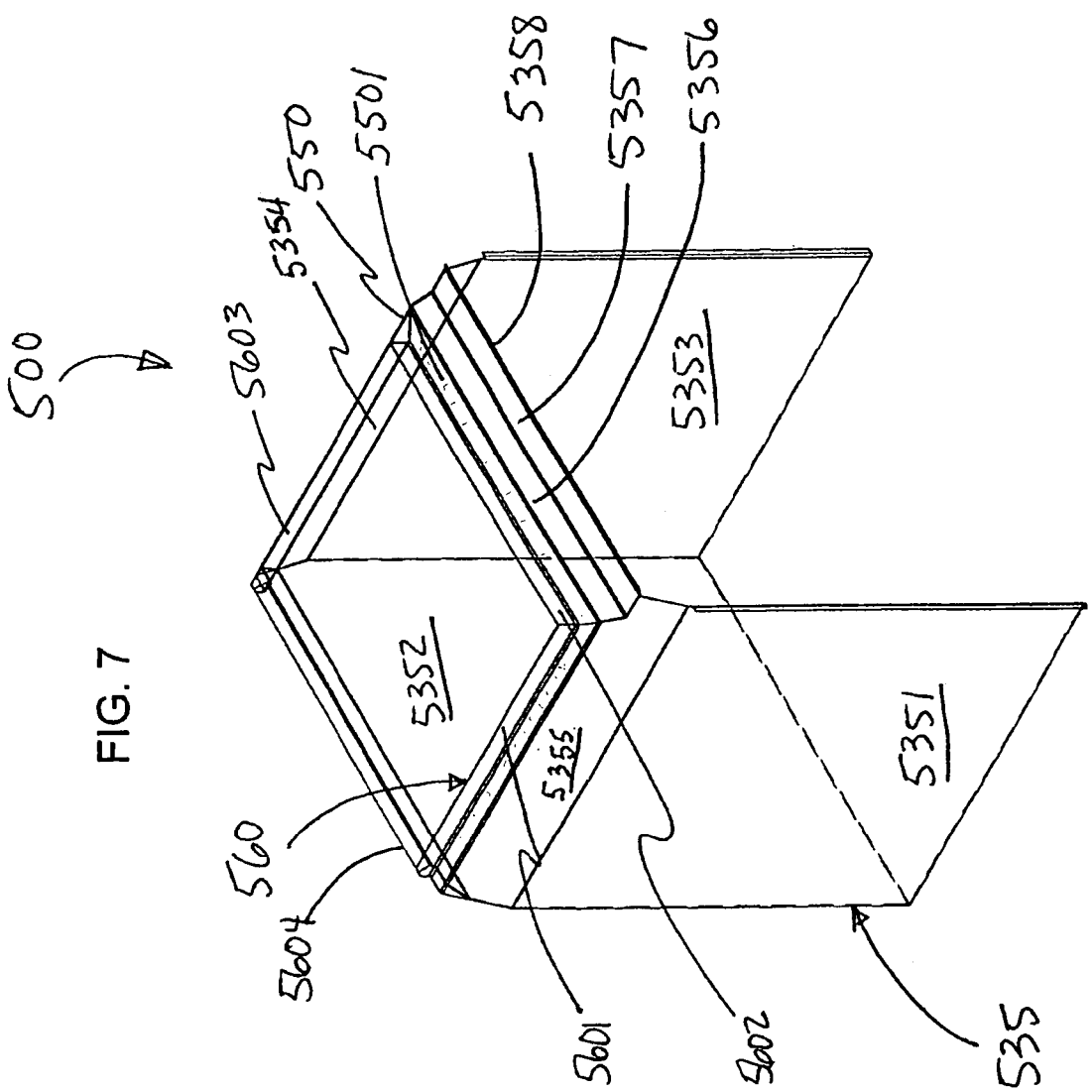

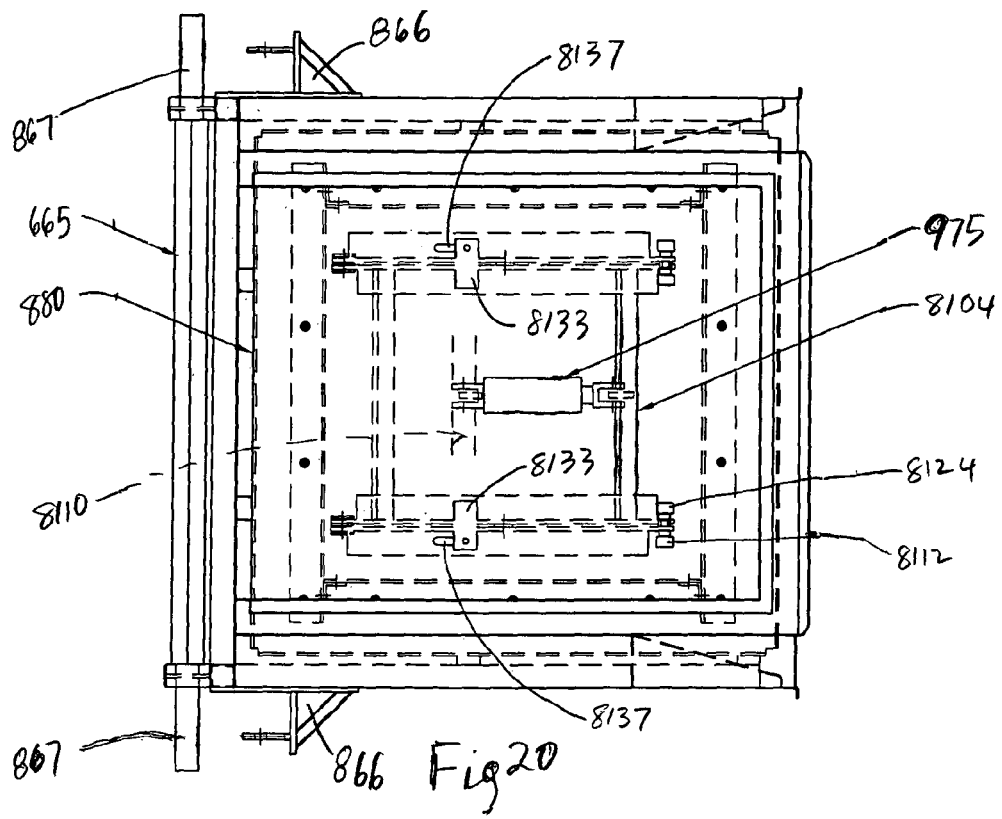
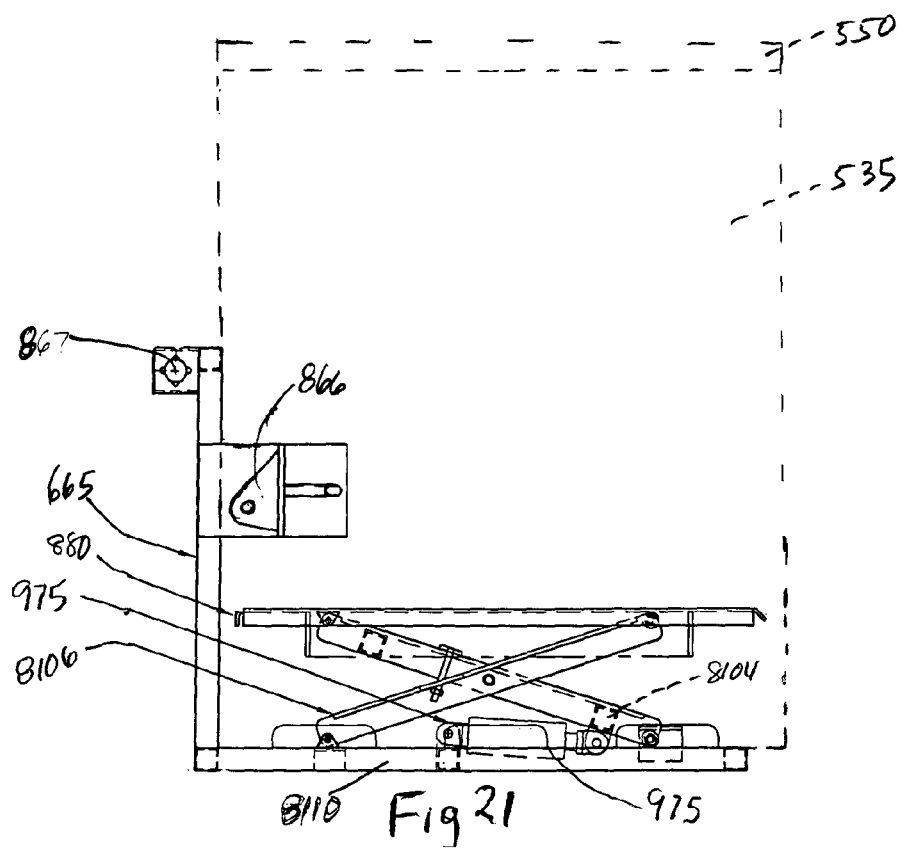

CONTAINER CONTENTS DISCHARGING STATION ASSEMBLY WITH SEALING GUARD LIP AND LOADING GUIDE SHOULDERS

This is an original non-provisional patent application, which claims priority to co-pending provisional patent application Ser. No. 60/788,273, filed Mar. 30, 2006.

This application relates to embodiments as described herein which may be used in discharging contents from containers or cartons by sealing the discharge opening of the container against a guard and guard lip, specifically, embodiments include container alignment shoulders, integral lifting mechanism, and lift plate stabilizers.

Consumers purchase plastic bags filled with blends of pre-cut, frozen vegetables, to reduce the time to prepare a meal at home. Such mixed blend frozen vegetable bags are created by mixing predetermined proportions of the selected frozen vegetables.

Large containers of pre-cut pieces of a single type of frozen vegetable are received and stored in open-top containers for discharging the frozen vegetables onto the conveying line. Throughout this application, the words "carton" and "container" are used interchangeably to identify the receptacle which contains the product to be dispensed. As the vegetables in the containers are commonly frozen by a process called individual quick freeze (IQF), ideally they should not be attached to the other pre-cut frozen pieces. However, the variations in temperature experienced by the IQF frozen vegetables during transit and handling often result in one or more large blocks or clumps of frozen vegetable pieces that have formed with ice. The flow characteristics of such clumps are not like that of water or of dry goods, like cereal. In fact, at times the vegetables do not exit a partially-inverted container without being dislodged or broken into smaller blocks or clumps. Operators often use metal rods to dislodge the large blocks of frozen vegetable pieces from the partially inverted containers.

The frozen vegetables are discharged into hoppers above the food conveying lines. The hoppers narrow in horizontal cross section to the intake of a breaking device designed to break chunks of frozen vegetables into individual frozen vegetable pieces, which are collected below the breaking device and are metered onto vibratory feeders or other feeding mechanisms for dispensing in set proportion into plastic bags to produce mixed blends of frozen vegetables for consumption in individual households.

The open top large cardboard or plastic containers or cartons are heavy when loaded and are typically moved to the process line by fork lift or similar vehicle, typically on wooden pallets. Typical box sizes of the cartons include (1) 40"×48"×43"; (2) 40"×41"×48"; (3) 39"×42"×47"; and (4) 46"×41"×48". A similar volume of product is shipped in each box. Frozen vegetables boxes typically weigh around 1500 pounds when full. "Full" means there may be several inches of empty space at the top of the container. Dry cereal boxes typically weigh between approximately 700 and 800 pounds and fruit boxes typically weigh more than 1500 pounds. When more product is needed on the packaging line, a fork truck will deliver a carton of frozen food to the processing line. The carton will be slid into a dumper discharge station assembly.

The frozen vegetables are typically discharged from the cartons by rotating the discharge assembly until gravity acts on the vegetables and causes them to fall out of the open "top" of the carton, which at that point has been rotated at least 90 degrees from its original position when loaded into the station, and typically is rotated another approximately 30 to approximately 45 degrees beyond 90 degrees. The rotation of the discharge assembly is most often mechanized due at least in part to the significant weight of the boxes when full of frozen vegetables. However, it must be noted that when the carton (sitting on the pallet) is placed in the discharge assembly, it is a "loose" fit. As soon as the discharge assembly begins to rotate, the carton slides forward against the front wall of the discharge assembly. As the rotation continues the carton begins to slide toward the top of the discharge assembly until the carton is inverted 90°. Thus the carton "bangs" around and against inside walls of the discharge assembly. Dirt, debris, and wood slivers from the wooden pallet may be tossed, shifted, and shuffled toward the open top of the discharge assembly. This debris may pass around the carton and fall into the product being dispensed into the hopper.

As may be understood, a container-contents discharging station assembly rotates, perhaps in addition to vertically and/or horizontally translating the carton, from a load/unload position (loading and unloading of a container into or out of the container-contents discharging station) to a discharge position, which as previously discussed, typically begins at about 90 degrees rotation, but typically extends from approximately 90 to approximately 135 degrees, depending on the level of frozen food in the container and the flow characteristics thereof.

These traditionally existing discharge station assemblies typically include a base frame and housing which are mounted with pivots to apply rotation forces to the containers. Typical base frames may also resist the torque created from the weight of the loaded carton being inverted over a hopper that is placed outside the footprint of the base frame and housing. Such a base frame may be bolted to the facility floor and may be designed to not move. A separate structural housing for supporting and retaining a carton is typically rotatably connected to the base frame. Typically this structural housing has three straight side walls and an open side. A stop bar extends across the open top of the housing from the right side wall to the left side wall. The bar crosses above the open top of the carton inside the housing. The bar extends parallel to the axis of rotation. The bar's purpose is to keep the carton from sliding out of the housing when inverted. Parts of the base frame will be in compression and some parts of the base frame may be in tension during the rotation of the structural housing and the carton it supports to partially invert the carton over the hopper, if placed outside of the footprint of the base frame.

Commonly, two hydraulic cylinders are used to rotate the assembly housing and the carton or container supported thereon. One hydraulic cylinder is typically attached to the base frame and a lug plate or pin bracket on one side of the structural housing and the other hydraulic cylinder is typically attached to the base frame and another lug plate or pin bracket on an opposing side of the structural housing. These hydraulic cylinders apply a force to the structural housing to rotate and/or lift the container from the load/unload position to the discharge position and back. The load position refers to the loading of the container or carton into the assembly housing prior to moving the housing and carton therein to the discharge position. Once the carton has been emptied and the housing reverse rotated, the empty carton is in the unload position for the fork truck to remove it from the assembly housing. When the structural housing is in a discharge position, the overhead cross-bar, or other structural member, may prevent the container from sliding or falling out of the space defined by the structural housing.

A standard three-sided housing or enclosure may be attached to the structural frame for receiving the four-sided open-top container. The open side of the housing allows the carton to be placed into the housing by the fork truck. Depending on the design of the enclosure, the enclosure may be strong enough and can therefore also serve as the structural frame to which to apply the rotating and/or translating forces to the container and/or support the container during rotation.

This disclosure relates to a discharge station assembly for dispensing products from an open top of a separate container or carton retained in the interior space of the discharge station assembly housing. The open top of the carton is sealed along its top edges against the inside of an overlapping lip of a guard plate coupled with the station assembly housing. The carton upper edges are urged upwardly against the overlapping lip in such sealing relationship by a lifting mechanism disposed beneath a movable floor or plate of the station assembly on which the carton rests. Once the carton is lifted and sealed against the overlapping lip, the discharge station is pivotally rotated to dispense the product contained within the carton into a hopper and onto a conveyor for further packaging processes. The discharge station assembly is provided with a pair of carton alignment shoulders within the assembly housing to ensure the carton is properly positioned within the station assembly before it is raised into sealing engagement with the overlapping lip. The station assembly is further provided with an undercut face section to prevent dispensed product from being caught on the leading edge of the carton top opening when the station assembly is rotated to discharge product onto the conveyor. Such an embodiment is particularly suitable for dispensing or dumping food product onto a conveyor without allowing miscellaneous debris which may be on the outer walls of the food carton or inadvertently inside the discharge station assembly from being dispensed along with the food product onto the conveyor and thereby contaminating the processing line.

A container-contents discharging station assembly consistent with embodiments described herein can include a guard member. The guard member can include a guard plate forming an overlapping lip along the top edge of the housing protruding inwardly toward the interior of the housing, such that a top edge of a container or carton placed in the interior of the enclosure will conform to the guard plate and overlapping lip, thereby eliminating any gaps between the containers' top edge and the guard plate along the top of both left and right sides and along the top at the rear side of the carton. Thus, a generally U-shaped guard plate may also be provided to form the overlapping lip to seal the right, left, and rear top edge of the carton when it is inverted.

A container-contents discharging station consistent with embodiments described herein can include a centrally located air bellows to raise a container to contact a guard.

A container-contents discharging station assembly consistent with embodiments described herein can include a pair of opposing carton alignment guide shoulders extending along opposite inner wall surfaces of the assembly housing to properly locate the container prior to rotation.

A method for sealing a discharge opening of a product container within an enclosure of a container-contents discharging station assembly to prevent material exterior to the container from entering a product stream consistent with embodiments disclosed herein can include urging an open-top container forward in the station assembly until the outer front wall of the container engages the inner front wall of the station assembly and, thereafter, raising the open-top container to seal a top surface of the container against a first guard plate lip. Then the container sealed to the first guard plate may be rotated to discharge the contents within the open-top container through an opening defined by the one or more walls of the open-top container as reduced by the guard plate, and any material that falls off the external surface of the carton or container will be stopped on the guard plate lip and be retained inside the space defined by the assembly housing.

It is to be understood that both the foregoing general description and the following detailed description are exemplary and explanatory only and are not restrictive of the invention, as claimed.

DETAILED DESCRIPTION OF THE DRAWINGS

The accompanying drawings, which are incorporated in and constitute a part of this specification, illustrate several embodiments and together with the description, serve to explain the principles of the embodiments described herein. In the drawings, FIG. 1 is a back view of a portion of a container-contents discharging station assembly for an open-top container or carton for frozen food according to some embodiments, the station including an embodiment of a guard;

FIG. 2 is a top view along line 2-2 of the portion of the container-contents discharging station illustrated in FIG. 1;

FIG. 3 is a perspective view of the portion of the container-contents discharging station assembly housing illustrated in FIGS. 1 and 2, but without the open-top container;

FIG. 4 is a top view of a portion of a container-contents discharging station assembly for an open-top container for frozen food according to some embodiments described herein; the station including another embodiment of a guard;

FIG. 5 is a side view of a portion of a container-contents discharging station according to some embodiments described herein with a guard plate positioned perpendicularly across three of the container side walls, and a guard plate positioned at an angle less than 90 degrees with the fourth container side wall;

FIG. 6 is a back view of a container-contents discharging station according to some embodiments described herein, with a vertical gap between a top edges of the open-top container or carton and the bottom surface of the guard plate on the assembly housing;

FIG. 7 is a perspective view of a guard according to some embodiments described herein;

Figure 19:
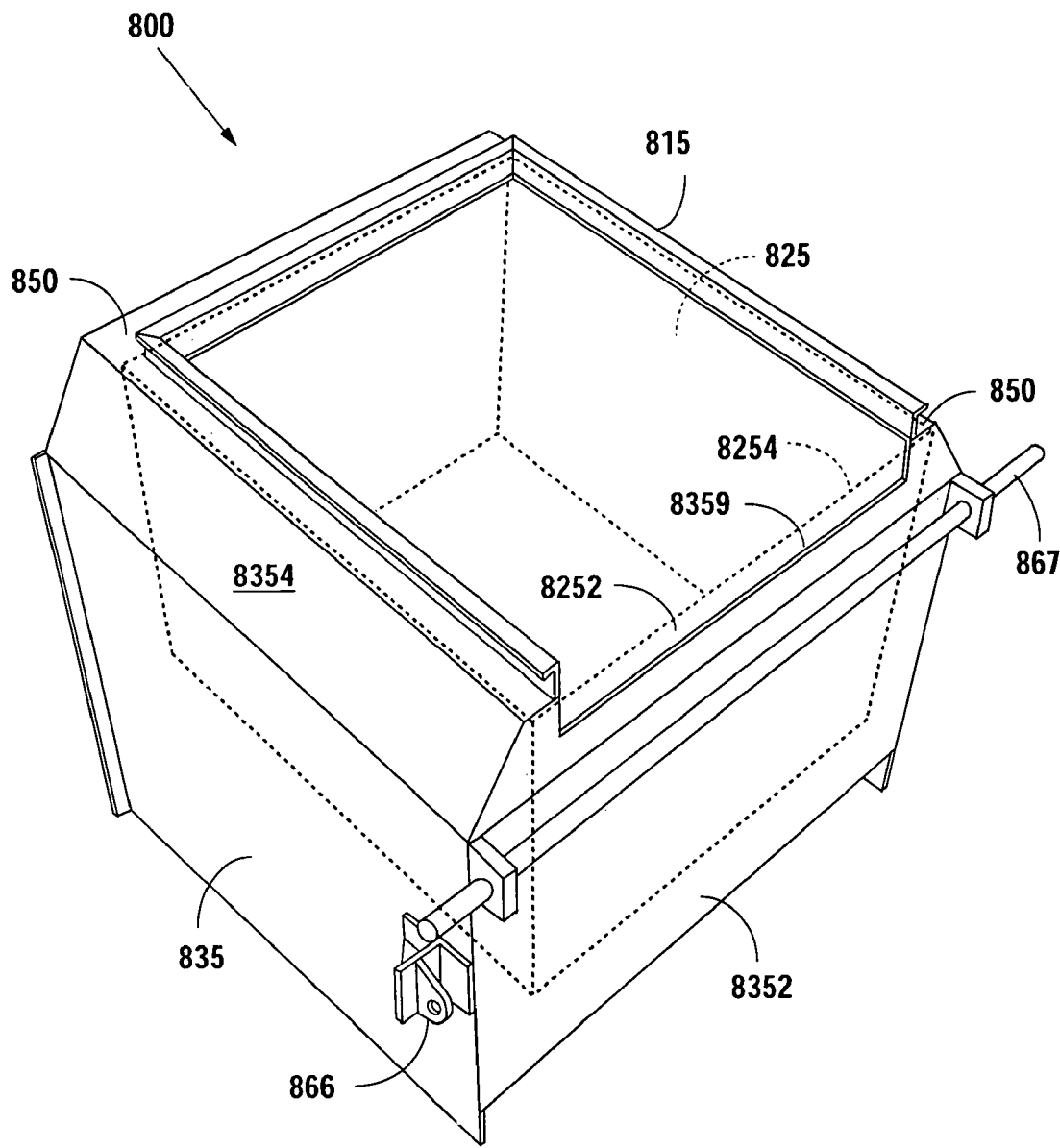

FIG. 19 is a top, front, right side perspective view of a portion of a container-contents discharging station of the present invention with a carton shown in broken lines in the raised, sealed position with the upper front edge of the carton open top extending above the undercut face section of the front wall of the assembly housing. The lifting mechanism, platform, and guide shoulders are not shown for clarity purposes.

FIG. 20 illustrates a top plan view of a scissor lift-assist assembly with a hydraulic lift cylinder.

FIG. 21 shows a partial side elevation view of the structural frame elements of some embodiments with a hydraulic lift cylinder attached to a scissor lift-assist assembly.

DETAILED DESCRIPTION OF THE PREFERRED EMBODIMENTS

Reference will now be made in detail to exemplary embodiments, which are illustrated in the accompanying drawings. Wherever possible, the same reference numbers will be used throughout the drawings to refer to the same parts. Similar parts will start with the first number of the embodiments shown. For example, the container or carton in embodiment 100 is labeled 125, and a similar container in embodiment 600 is labeled 625.

FIG. 1 illustrates a portion of a container-contents discharging station assembly 100 according to some embodiments described herein. As illustrated in FIG. 1, a rectangular cross-sectioned container or carton 125 with a first side wall 1251, front side wall 1252 (illustrated in FIG. 2), a third side wall 1253, a back side wall 1254, and a bottom wall or floor 1255 (illustrated in FIG. 2) rests on a support plate 130 (illustrated in FIG. 1) and is enclosed in a space defined within the assembly by three vertical walls, left side wall 1351, front side wall 1352, and right side wall 1353, that make up an enclosure or housing 135. As illustrated in FIG. 1, each of vertical side walls 1351, 1352, and 1353 of enclosure or housing 135 is fixedly attached to support plate 130 and together serve as a frame to which forces for rotating the housing 135 and thus rotating container or carton 125 may be applied by means well known in the art. In some embodiments, and as illustrated in FIG. 1, a guard plate 150 is continuously attached to vertical side walls 1351, 1352, and 1353 of enclosure 135 along the top edge of each of vertical side walls 1351, 1352, and 1353 with a portion of the plate 150 forming an overlapping lip 1509. In some embodiments, and as illustrated in FIG. 1, guard plate 150 is shaped like a rectangular frame in that it is rectangular with a smaller, but similarly shaped, rectangular through-hole therein, such that the two rectangles share the same centers (illustrated in FIG. 2). In some embodiments, and as illustrated in FIGS. 1 and 2, guard plate 150 has a top surface 1501 and a bottom surface 1502, and four vertical surfaces defining the rectangular through-hole, two of which, 1503 and 1505, are called out in FIG. 2. In some embodiments, the top surface 1256 (illustrated in FIGS. 1 and 2) of each side wall 1251, 1252, 1253, and 1254 of carton 125 is to be in contact with bottom surface 1502 of guard plate 150. FIG. 1 illustrates a slight space merely to clarify the separate parts, but in operation the edge 1256 contacts the underside of the lip 1509.

FIG. 2 illustrates a top view along line 2-2 in FIG. 1 of the portion of the container-contents discharging station 100. As illustrated in FIG. 2, plastic or cardboard container 125 is below guard plate 150 and behind the overlapping lip 1509. Top surface 1256 of side walls 1251, 1252, 1253, and 1254 is illustrated with two hidden lines between the rectangular through-hole and the perimeter of guard plate 150. In some embodiments, and as illustrated in FIG. 2, guard plate 150 extends across the open top of container 125 an amount labeled X which is the size of the lip overlap, and away from the outside perimeter of container 125 by an amount labeled Y. This leaves a gap Y between the outside walls of the carton 125 and the inside of the enclosure or housing 135. In the embodiment illustrated in FIG. 2, the top view dimensions of guard plate 150 match those of support plate 130, as well as the cross section of the space defined by the three-sided enclosure 135, whose inner surfaces of walls 1351, 1352, 1353 are illustrated in FIG. 2 in hidden lines. When rotated to a discharge position, container 125 may discharge its contents through the opening defined by surfaces 1503, 1504, 1505, and 1506.

As understood from the discussion above and FIG. 1, in some embodiments, there is no gap between top surface 1251 of container 125 and under surface 1502 of guard plate 150. Contaminating materials that may exist on the external vertical surfaces of container 125 may fall off the outer side walls of the carton, pass through the gap Y between the carton and the housing inner wall, and fall on support plate 130 or out the bottom of the housing. When container 125 is rotated to discharge its contents, any loose debris or material laying on support plate 130 or in the gap Y may fall onto front side wall 1352 of housing 135 and if container 125 is rotated more than 90 degrees, material now laying on front side wall 1352 of enclosure 135 in addition to other material that may fall off of the external surfaces of the vertical walls of container 125 may land on "bottom surface" 1502 of guard plate 150, but it cannot spill out of the housing into the dispensed food flow path. In some embodiments and as illustrated in FIG. 1, because top surface 1256 (illustrated in FIG. 2) of container 125 is in contact with bottom surface 1502 of guard plate 150, there is no gap for material to fall into the discharge opening defined by walls 1503 through 1506. It should be understood that in some embodiments and as described in relation to FIGS. 1-2, guard plate 150 further supports and retains container 125 in the housing 135 when rotated more than 90 degrees and therefore the guard may serve an additional function as part of the housing frame of the assembly.

FIG. 3 is a simple perspective drawing of the portion of the container-contents discharging station assembly 100 illustrated in FIGS. 1 and 2, but for convenience, the walls of housing or enclosure 135 and guard plate 150 have not been illustrated as having any thickness. In this figure, container-contents discharging station 100 is illustrated without a container 125. When a container 125 is readied for discharge, it may be loaded into the space defined by support plate 130 and enclosure 135. Container 125 may be loaded through an opening defined by the back edge of support 130, the interior surfaces of the parallel walls of enclosure 135 and guard plate 150. It will be understood that cartons or containers loaded into housing 135 are sized to fit snugly at the top and bottom; there is no room for space along the top edge of the carton and the underside of the guard. These embodiments are a little more time consuming to arrange, but do not require a separate lifting floor or plate to raise the carton to urge the top edge of the carton against the guard lip. Embodiments with lifting platforms or plates will be discussed further below.

In some embodiments and as illustrated in FIG. 4, a container-contents discharging station 200 may incorporate a guard plate 250 that is generally "U" shaped. There is no overlapping guard lip on the front of the housing about the top edge 2256 of the carton 225. In some embodiments and as illustrated in FIG. 4, guard plate 250 may be in contact with and connected to only the top surfaces of the left and right side walls of housing or enclosure 235 that are parallel, namely 2351 and 2353 as illustrated, but spans between these walls along the rear to complete the "U" shape. As illustrated in FIG. 4, container 225 is shown as a rectangular cross-sectioned container including four sides walls: left side wall 2251, front side wall 2252, right side wall 2253, and rear side wall 2254. In some embodiments and as illustrated in FIG. 4, a portion of top surface 2256 corresponding to front side wall 2252 is not in contact with guard plate 250. As illustrated by the arrow labeled "LOAD," container 225 may be loaded into container-contents discharging station 200 from the rear or back. In some embodiments and as illustrated in FIG. 4, container 225 may be loaded such that front wall 2252 is in full contact with inner surface of front side wall 2352 of enclosure 235 and centered between side walls 2351 and 2353 of enclosure 235. In some embodiments, and as illustrated in FIG. 4, when carton front wall 2252 and housing front wall 2352 are in contact, any material or debris present on the external surface of carton front wall 2252 or housing front wall 2352 will be pressed between these surfaces and held in position between these two front walls as the housing is rotated. Thus any such material or debris will not fall into the product flow path. Moreover, because guard plate 250 does not extend across the top opening of container 225 adjacent to front wall 2252 in this embodiment, guard plate 250 does not impede the flow of contents, such as frozen food, as it discharges past this edge, as the frozen food may when rotated to a discharge position.

A container-contents discharging station assembly 300 according to some embodiments described herein is illustrated in FIG. 5. As illustrated in FIG. 5, container-contents discharging station 300 includes a support plate 330, a three-sided enclosure 335 having side wall 3351, 3352 (illustrated in hidden line), and a side wall opposite and parallel to side wall 3351, a generally "U"-shaped guard plate 350 similar to guard plate 250, and a rectangular guard plate 351 (illustrated in hidden line). As illustrated in FIG. 5, container 325 may be loaded into container-contents station 300 from the back, illustrated by the arrow labeled "LOAD" on the right hand side of the figure.

As illustrated in FIG. 5, "U"-shaped guard plate 350 is in contact with and connected to the top surfaces of side walls 3351 and the opposing and parallel side wall that is not visible in FIG. 5. As illustrated in FIG. 5, guard plate 350 is in contact with top surfaces of side walls 3251, the opposing and parallel side wall, and 3254 (illustrated in hidden line) of container 325 (illustrated in hidden line) and forms a 90 degree angle with each side wall. As guard plate 250 of FIG. 4 extended across the open top of container 235 an amount labeled "X," so does guard plate 350 extend across the open top of container 325 (illustrated in hidden line), thereby reducing the discharge opening of open-top container 325. As illustrated in FIG. 5, rectangular guard plate 351 is in contact with the front top edge of container 325, and forms an acute angle, theta, with the external surface of front wall 3252 (illustrated in hidden line) of approximately 45 degrees as illustrated. In some embodiments and as illustrated in FIG. 5, guard plate 351 does not extend past the top surface of front wall 3252 and therefore does not impede the flow of contents from container 325 when in a discharge position, nor reduce the discharge opening discussed above.

As mentioned previously, containers, such as containers 125, 225, and 325, are often stored on pallets and are transported and loaded into a container-contents discharging station with a fork lift. While many fork lift operators develop relatively precise placement skills with these and similar machines, fork lifts maneuvers are not known for precision as would be needed to load a container through an opening vertically sized to the same height as the container (or container and pallet). Accordingly, loading a container into a container-contents discharge station such as 100, 200, and 300, may not be easily accomplished, even if sized to accommodate the height of a pallet (which is typically 5 inches). To make the loading and unloading operation of a container into or out of a container-contents discharging station easier, the three-sided wall enclosure, such as 135, 235, and 335 may be increased in height to provide a margin for loading and unloading containers (whether or not on pallets).

FIG. 6 illustrates a container-contents discharging station assembly 400 similar in all respects to container-contents discharging station 100 illustrated in FIGS. 1-3, except that the height of the housing or enclosure walls exceeds the expected height of carton or container 425 by a predetermined amount. As illustrated, then, in the load/unload position, container 425 rests spaced apart and below bottom surface 4502 of guard plate 450 by a distance labeled with a "Z." As illustrated, container 425 is loaded into enclosure 435 from the back (into the page) as illustrated by an encircled X and the word "LOAD."

Thus, when station 400 is rotated, container 425 in housing 435 is moved toward a discharge position. Container 425 will shift or translate within enclosure 435 with the front side wall of the carton engaging the inner surface of the front side wall of the housing 435. As the rotation continues, carton 425 will slide upwardly toward the guard 450 until the top surface of container 425 is in contact with bottom surface 4502 of the guard. Guard plate 450 restricts objects on all outside surfaces of the container (except possibly 4254) from being able to reach the discharge opening prior to the top surface of container 425 contacting and sealing against bottom surface 4502 of guard plate 450.

FIG. 7 is a perspective view of another portion of a container-contents discharging station 500 according to some embodiments described herein. In FIG. 7, no bottom or floor support plate is illustrated. As illustrated in FIG. 7, container-contents discharging station 500 includes an enclosure or housing 535 made of vertical side walls 5351, 5352, and 5353, and two inwardly angled walls, 5354 and 5355 atop of wall 5353 and 5351, respectively. As illustrated in FIG. 7, and in some embodiments, angled enclosure wall 5354 is integrally connected to vertical side wall 5353 and forms an approximately 150 degree angle therebetween thereby providing an inward slope to wall 5354. As illustrated in FIG. 7, and in some embodiments, angled enclosure wall 5355 is integrally connected to vertical side wall 5351 and forms an approximately 150 degree angle therebetween again providing an inward slope to wall 5355. In some embodiments, enclosure 535 also includes three cross walls, two of which connect portions of angled enclosure walls 5354 and 5355. A first cross wall 5356 connects angled enclosure walls 5354 and 5355 and forms an approximately 30 degree angle from vertical (illustrated in FIG. 9). As illustrated in FIG. 7, a second cross wall 5357 also connects enclosure walls 5354 and 5355 and is integrally connected to first cross wall 5356. As illustrated in FIG. 7, second cross wall 5357 is horizontal. As illustrated in FIG. 7, a third cross wall or lip 5358 is integrally connected to second cross wall 5357 along the length that "crosses" the enclosure and forms an approximately 135 degree angle therebetween (illustrated in FIG. 9). Accordingly, third cross wall or lip functions to provide an angled flange at the loading/unloading opening of enclosure 535.

Figure 8:
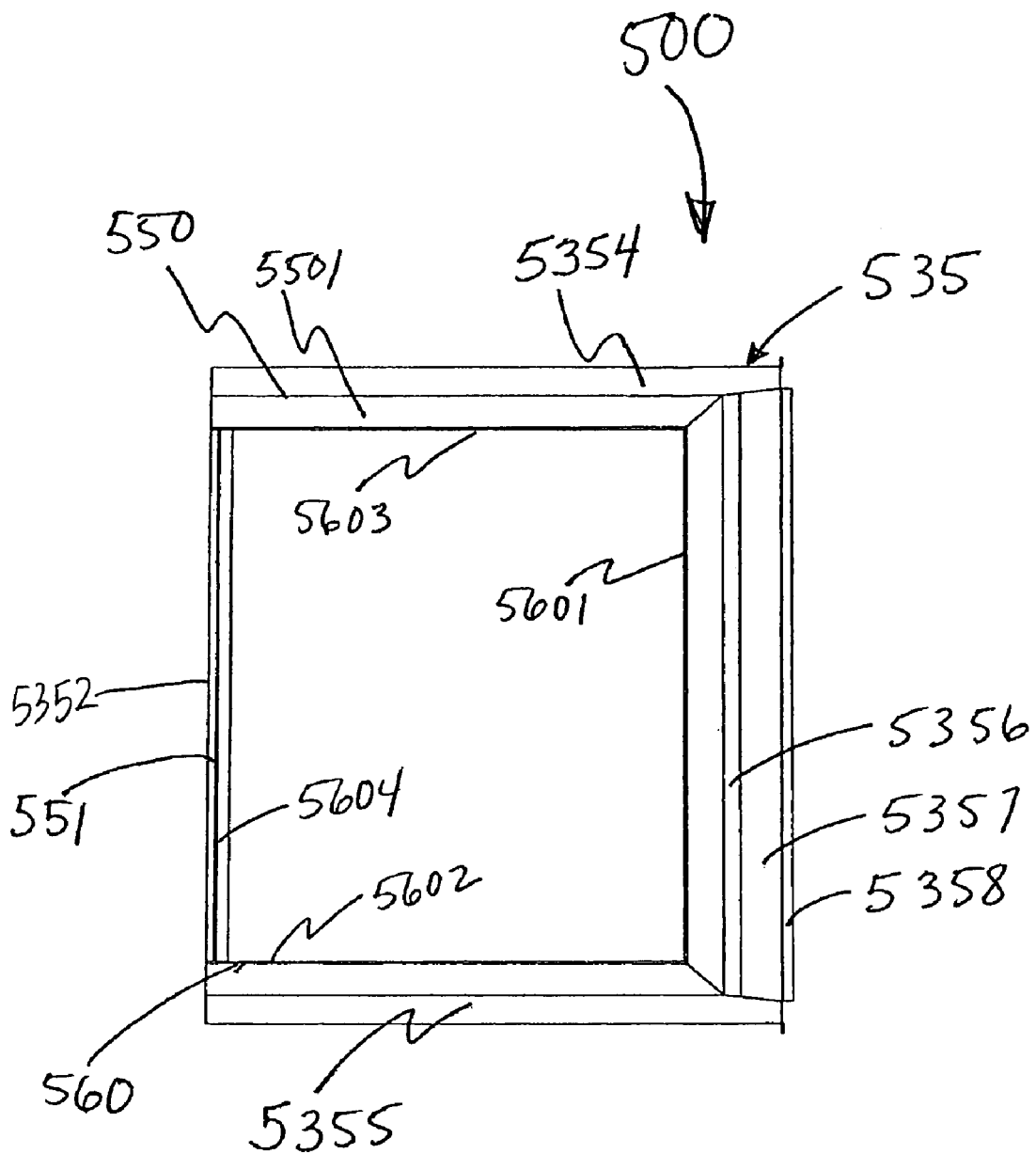
FIG. 8 is a top view of the guard illustrated in FIG. 7.
Figure 9:
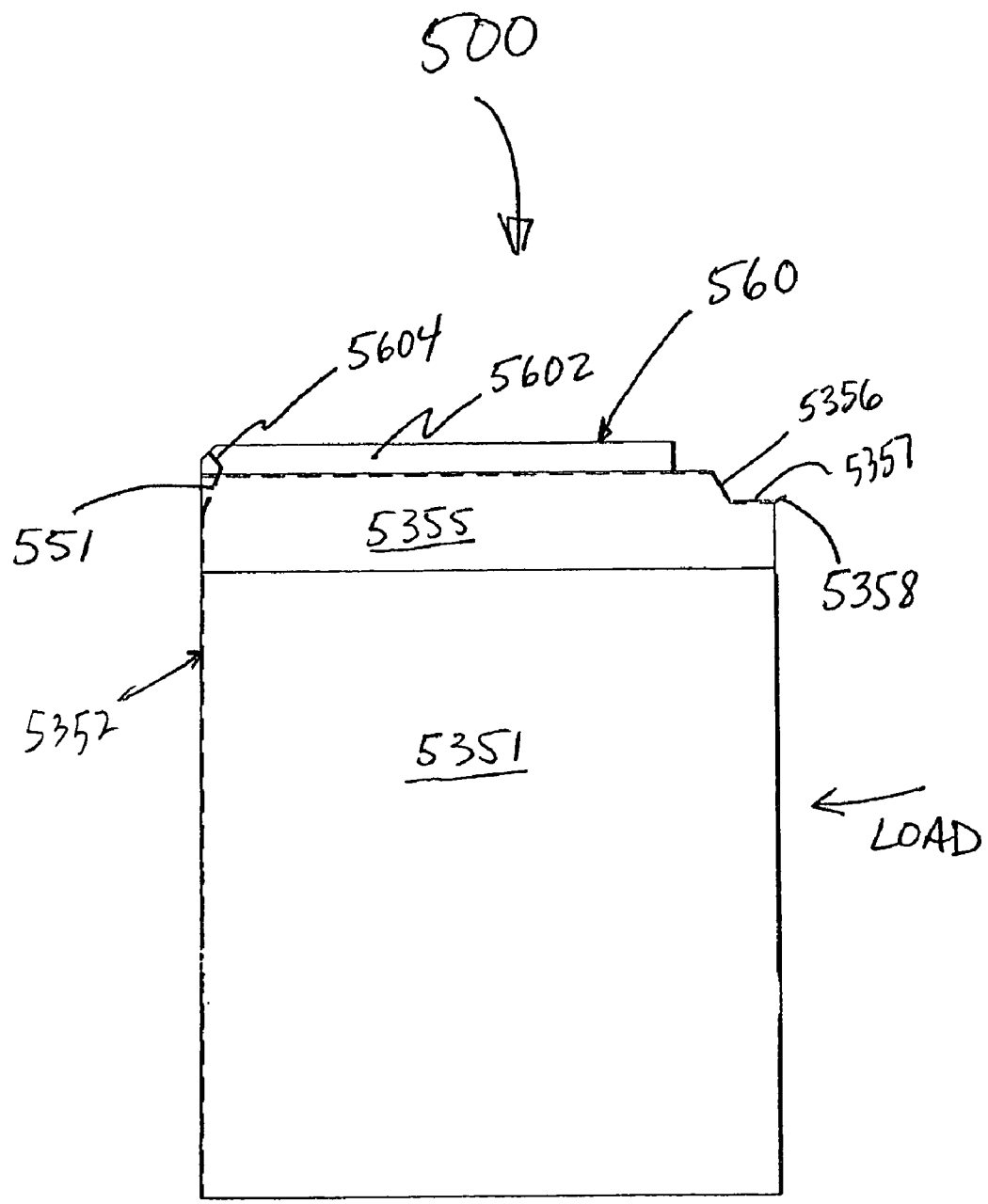
FIG. 9 is a side view of the guard illustrated in FIG. 7.

As illustrated, guard plate 550 is a generally "U" shaped plate connected to enclosure side walls 5355 and 5354 and first cross wall 5356 and is horizontal when container-contents discharging station 500 is in the load/unload position. As illustrated in FIGS. 8 and 9, guard plate 551 is a rectangular plate connected to enclosure front wall 5352, extending 1 and 13/16" into the interior of enclosure 535 and forming an angle of approximately 158 degrees with enclosure front wall 5352. Guard plate 551 may form other angles with enclosure front wall 5352 as desired. In some embodiments, guard plate 551 functions to deform the container or carton front top edge lip such that the front side wall of the carton lies flush against the internal surface of guard plate 551, at least at the edge. Having the front side wall of the container flush against guard plate 551 may prevent anything in enclosure 535 but outside of the container from being discharged through the discharge opening. Because the carton or container may bow both horizontally and vertically, when filled, a generally circular section of the front wall of the carton may be in contact with enclosure front wall 5352. Thus the top edge of the front side wall on the carton may not be in contact with enclosure front wall 5352 and the distance between the two increases as one approaches the corners of the container. By adapting a portion of a front enclosure wall to protrude into the interior of enclosure 535, the front side wall of the container can be formed into a straight line in contact with angle guard plate 551. The angle that guard plate 551 makes with enclosure front wall 5352 depends on how far a container typically bows and the size of the guard plate. The larger the angle of the guard plate 551, the smaller the angle for a given desired distance of protrusion. At a certain height, the front wall will resist deformation to a greater extent due to the presence of its contents within the container. Thus angle guard plate 551 is typically 4 to 6 inches in length (the width being determine by the container width), as most containers are typically empty for the first several inches, and therefore less resistant to the desired force and resulting desired deformation back to a straight span.

Container-contents discharging station 500, as illustrated in FIG. 7 also includes a projection 560 that functions to strengthen guard plate 550 and to guide the discharged food into the hopper. Projection 560 includes three vertical walls 5601, 5602, and 5603, and an angled wall 5604. As illustrated in FIG. 7, vertical wall 5601 is connected to guard plate 550 and forms an approximately 90 degree angle therebetween. Vertical wall 5602 is connected to guard plate 550 and vertical wall 5601 and forms approximately 90 degree angles with each piece to which it is connected. Vertical wall 5603 is connected to guard plate 550 and vertical wall 5602 and forms an approximately 90 degree angle with each. Angled projection wall 5604 is connected to angle guard plate 551 and forms an angle of approximately 118 degrees therebetween. Angled wall 5604 is also connected to vertical walls 5601 and 5603 and forms approximately 90 degree angles with each.

FIG. 8 depicts a top view of the portion of container-contents discharging station 500 illustrated in FIG. 7. Most clearly visible in this view is top surface 5501 of guard plate 550.

FIG. 9 depicts a side view of the portion of container-contents discharging station 500 illustrated in FIGS. 7 and 8. Most clearly visible in this view are the various angles that first, second and third cross walls 5356 (illustrated in FIGS. 7 and 8), 5357 (illustrated in FIGS. 7 and 8), and 5358 form with one another and that angle guard plate 551 and angled projection wall 5604 form with each other. Also visible is the relative height of vertical projection wall 5602.

Figure 10:
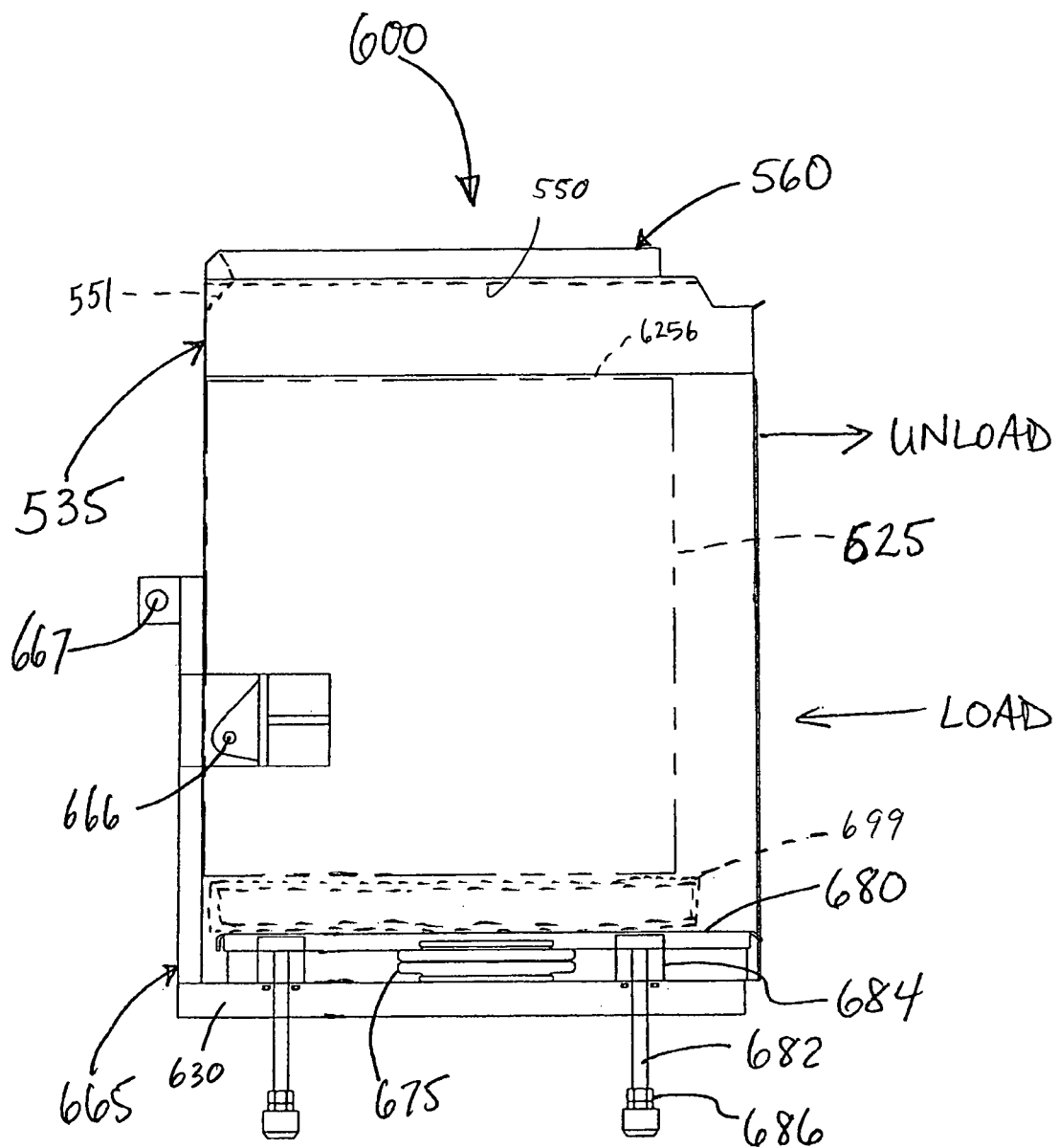
FIG. 10 is a side view of a container-contents discharging station according to some embodiments described herein including the guard illustrated in FIGS. 7-9, a support plate movable within a frame, and a collapsed (uninflated) air bellows.

FIG. 10 depicts a portion of a container-contents discharging station 600 according to some embodiments described herein. As illustrated in FIG. 10, container-contents discharging station 600 utilizes housing or enclosure 535, guard plate 550 (illustrated in hidden lines), angle guard plate 551 (illustrated in hidden line), and support/projection 560 as described in conjunction with FIGS. 7-9 and container-contents discharging station 500. Container-contents discharging station 600 is illustrated with container 625 (illustrated in hidden line) in the load/unload position. Also illustrated in FIG. 10, is a structural frame 665 to which enclosure 535 is fixedly connected and to which a rotating mechanism (not shown) applies a force to rotation yoke 666 to rotate frame 665 and enclosure 535 (and its contents) about bearing journals 667.

In some embodiments, and as illustrated in FIG. 10, a bottom surface having an air bellows 675, or other suitable lifting member, such as a hydraulic lift cylinder, is connected to structural frame and base 665 and 630. Air bellows are well known in the art, and an example of suitable air bellows for this application include Firestone W01-358-6811 air actuator, double convolute bellows with an 11.25" stroke, or Endine Y 12B14-363 air actuator, double convolute bellows with an 11.8" stroke. In FIG. 10, air bellows 675 is in a collapsed, or uninflated state. A top surface of air bellows 675 is connected to a lift plate assembly 680, which is movable within enclosure 535 to raise container 625 whether or not on a pallet 699 to contact upper edges 6256 of container 625 to guard plates 550 and 551. The motion of lift plate assembly 680 is guided by the interface of four guide rods 682 (two of which are not illustrated because they are directly in line with the two illustrated), which are attached to lift plate assembly 680, and extend through the diameter of a through-hole in each of four guide blocks 684, which are connected to structural frame 665. The placement of guide rods 682 may affect any deformation of lift plate assembly 680 under load while being raised on in its highest position. The selected distance may depend on the whether the container center of gravity is expected be stable relative to the volumetric center of the contents of the container, and whether or not air bellow 675 extends its full stroke to bring container 625 into contact with guard plate 550. Preferably, guide rods are located sufficiently close to air bellows 675 to minimize deformation of lift plate assembly 680. As illustrated in FIG. 10, vertical motion stops 686 may be provided on guide rods 682 to set a mechanical stop to limit the upward travel of lift plate assembly 680. The strength and rigidity of lift plate assembly 680 may affect its deformation while being raised by air bellows 675 and in its highest position, due to the application of an upward force at the point of attachment of air bellows 675 and an opposing force at the point of attachment of each guide rod 682 to lift plate assembly 680.

Figure 10A:
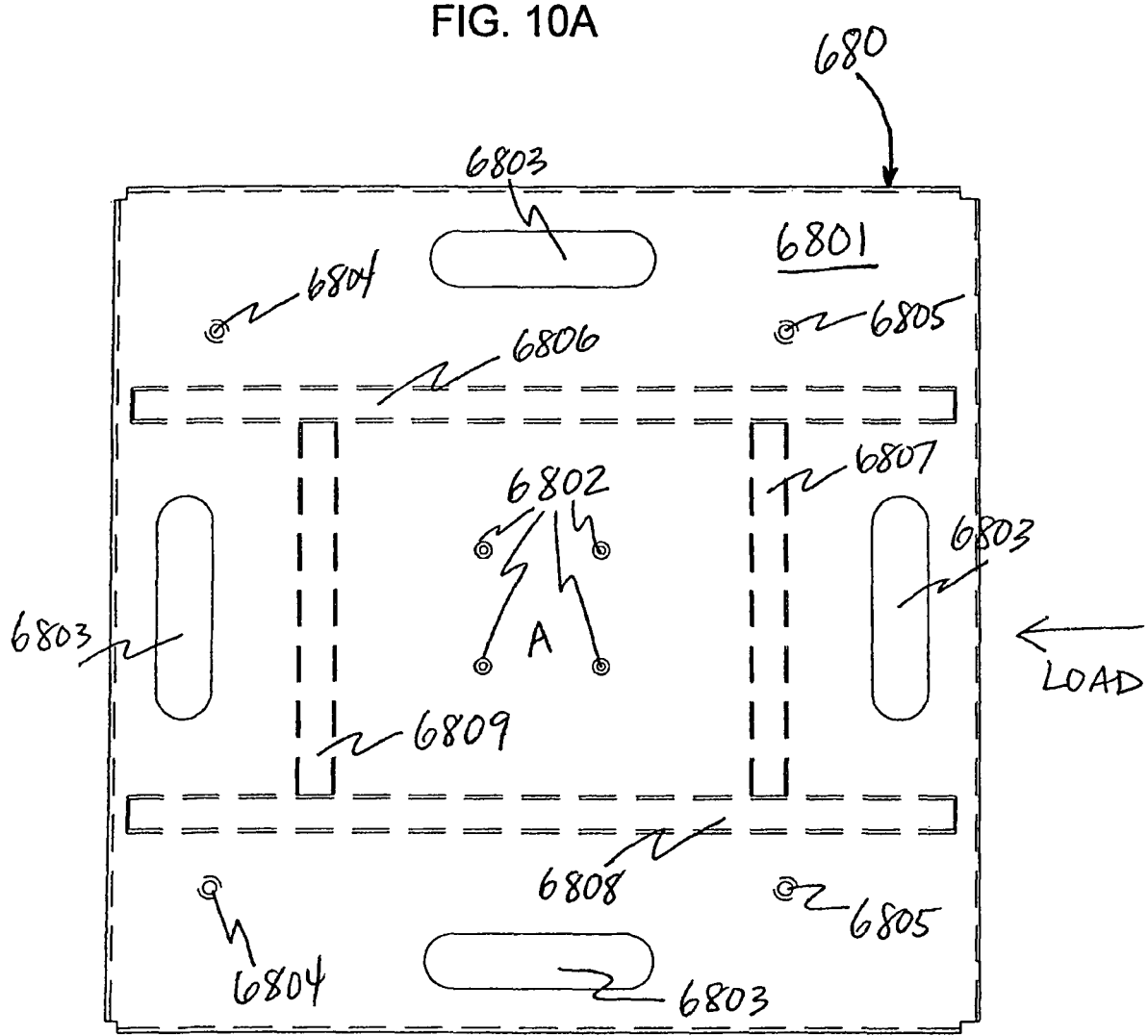
FIG. 10A is a top view of the support plate illustrated in FIG. 10.

FIG. 10A illustrates a top view of a possible construction of lift plate assembly 680. As illustrated, lift plate assembly 680 includes a generally thin plate 6801 with 12 through-holes therein. As illustrated, four through-holes 6802 may be used for attaching air bellows 675 to plate 6801. As illustrated four slots 6803 may be used for cleaning procedures within the enclosure and providing apertures for debris on the outside of a container to fall to a top surface of frame 665. As illustrated, two through-holes 6804 and two through-holes 6805 may be used for attaching guide rods 682 to plate 6801. In some embodiments, plate 6801 may be constructed of sheet metal. In some embodiments, plate 6801 may be constructed of 3/16"-5/16" plate metal.

Bar members 6806, 6807, 6808, and 6809 (all illustrated in hidden line) may provide structural support and rigidity to minimize unstabilizing deformation of plate 6801 during lift and while in its highest position during rotation of structural frame 665 (and its contents) (illustrated in FIG. 10) about journal 667 (illustrated in FIG. 10). One or more of bar members 6806, 6807, 6808, and 6809 may also support some of the weight of container 625 when air bellows 675 is in a compressed state. In some embodiments, and as illustrated in FIG. 10A, bar members 6806, 6807, 6808, and 6809 may be constructed of rectangular tubing and may be attached to plate 6801 by welding. In some embodiments, 2"×4" rectangular tubing may be used to construct one or more bar members. As illustrated, bar members 6806 and 6808 are parallel to each other and are equidistant from the center A of four through-holes 6802. As illustrated, bar members 6807 and 6809 are parallel to each other and are equidistant from the center A of four through-holes 6802. Strengthening may be provided by many methods and variations on the above described structure.

As illustrated in FIG. 10A, through-holes 6804, which indicate the location of two of the four guide rods 682, are equidistant from the center A of four through-holes 6802. As illustrated, each through-hole 6804 is also equidistant from its nearest bar member 6806 or 6808. As illustrated, each through-hole 6805 is also equidistant from its nearest bar member 6806 or 6808. As illustrated, however, through-holes 6804 and through holes 6805 are not symmetric about a line going through the center A of four through-holes 6802 and parallel to bar members 6809 and 6807; through-holes 6804 are a greater distance away from that line than through-holes 6805. As illustrated, through-holes 6804 and 6805 are closer to bar members 6806 and 6808 than to an edge or corner of plate 6801.

Referring again to FIG. 10, in the position of container-contents discharging station 600 illustrated, a container may be loaded into station 600 from the back as indicated by an arrow labeled "LOAD." A container may also be unloaded from the back as indicated by an arrow labeled "UNLOAD." As illustrated, container-contents discharging station 600 is designed to accept containers 625 on pallets 699. After loading container 625 into station 600, an operator may open a valve (not illustrated) to allow pressure regulated air from a pressurized air supply (not illustrated) into air bellows 675 through a regulator (not illustrated), which will inflate air bellows 675, causing lift plate assembly 680 to raise until all vertical motion stops 686 contact a bottom surface 630 of structural frame 665.

Figure 11:
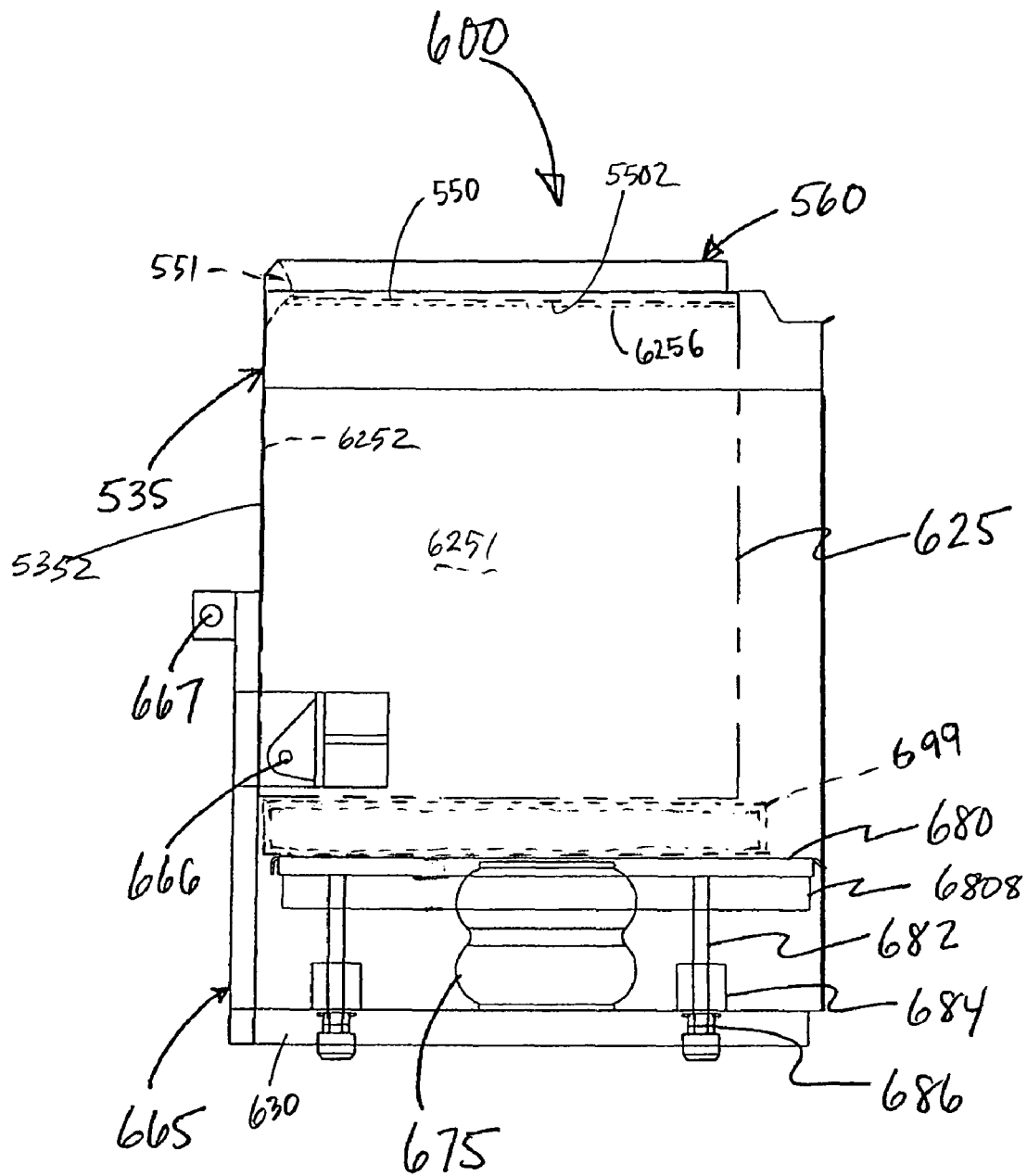
FIG. 11 is a side view of the container-contents discharging station illustrated in FIG. 10, with the air bellows inflated, resulting in sealing the top surface of the container against the guard.

FIG. 11 depicts station 600 in the state as described immediately above. Air bellows 675 is illustrated in an extended inflated position. The range of air pressure delivered depends on the size of the air bellows selected, the expected load to lift, the compression rating of the container, and the desired sealing force to apply to the container. For example, depending on the foregoing conditions, air pressure may be approximately 30 psi.

As illustrated in FIG. 11, vertical motion blocks 686 are in contact with a bottom surface of structural frame 665 and lift plate assembly 680 has raised the corresponding amount. As lift plate assembly 680 supports container 625 on pallet 699, container 625 has also been raised a corresponding amount, such that the top surface of each of its side walls 6251, 6253 (not illustrated) and 6254 (not illustrated) are in contact with bottom surface 5502 of guard plate 550. As illustrated, container 625 was placed in enclosure 535 with its front wall 6252 in contact with front wall 5352, guide plate 551 may be in contact with and therefore distort the top portion of front wall 5352. However, it is common for containers, such as container 625, to not have perfectly vertical side walls, but to be outwardly bowed by the settling of the contents and the lack of sufficient rigidity to not deform under such weight. Containers are typically constructed of corrugated cardboard with reinforced corners and plastic liners. Plastic containers are typically used for shipping of fruit and heavier loads.

In cases where container 625 experiences a bow, guide plate 551 may not be in contact with more than the front upper edge of container 625. When top surface 6256 is in contact with guide plate 550 and front side wall 6252 is in contact with guide plate 551 or the front upper edge of container 625 is in contact with guide plate 551, a seal is formed that prevents material present in enclosure 550 or the external surface of container 625 from gaining access to the discharge opening defined by the open top of container 625 as reduced by the portion of guard plates 550 and 551 that may extend across the open top of container 625. With container 625 sealed against guard plates 550 and 551, the operator of station 600 may control it to rotate structural frame 665 (and its contents) to a position wherein container 625 will begin to discharge its contents.

Figure 12:
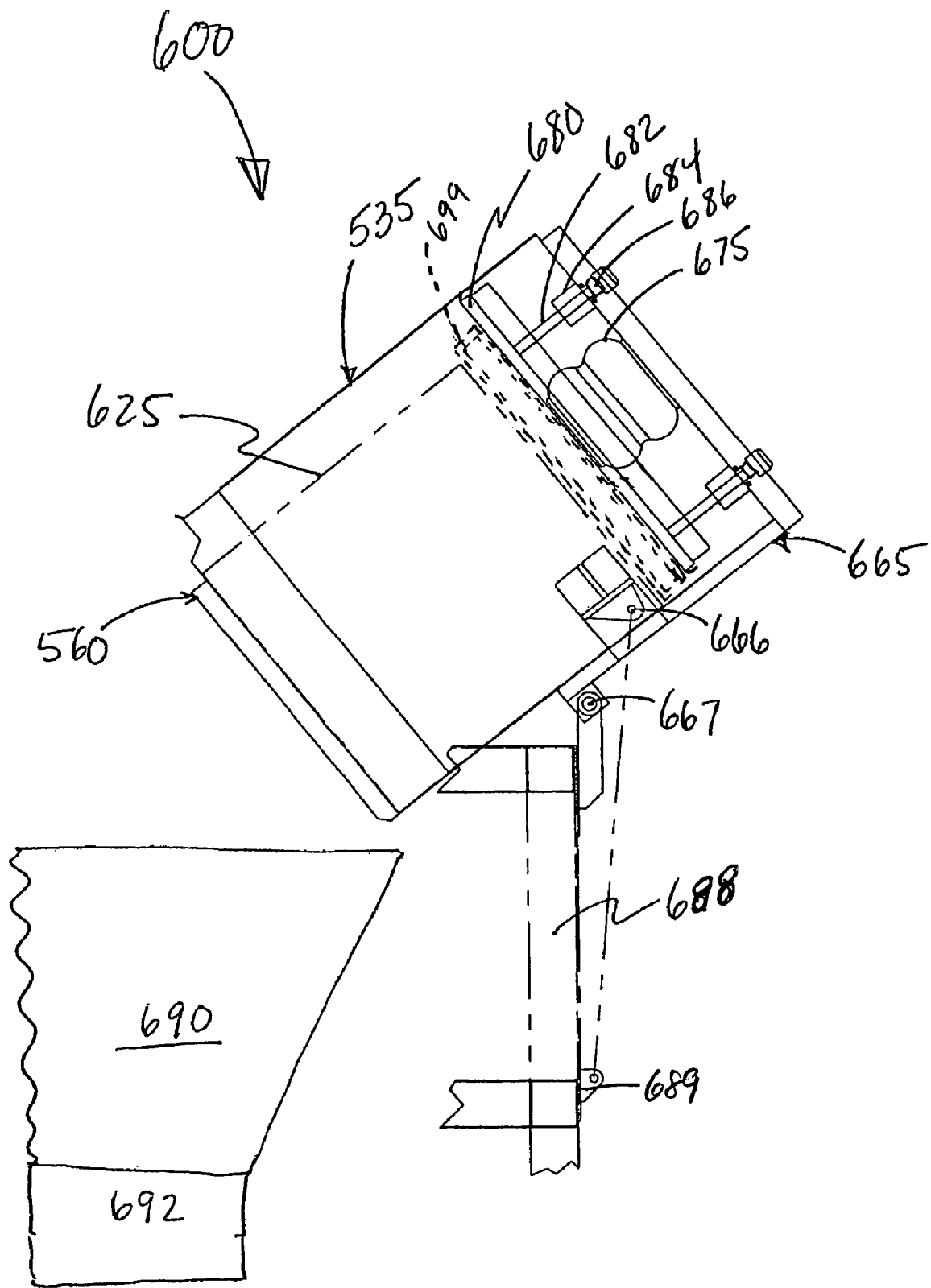
FIG. 12 is a side view of the container-contents discharging station illustrated in FIG. 11, but rotated approximately 130 degrees to a discharge position.

FIG. 12 illustrates a position of station 600 in which container 625 will discharge its contents. Structural frame 665 (and its contents) have been rotated approximately 130 degrees about journal 667 on base frame 688 from the sealing position illustrated in FIG. 11, and from the load/unload position illustrated in FIG. 6. Rotation is normally achieved by the extension of hydraulic lifting cylinders (not shown) connected to lifting yoke 666 on the station frame 665 and base frame 668 or other similar location. After container 625 has emptied its contents, or discharged a desired amount into a hopper 690, that supplies chunk-breaking device 692, an operator may control station 600 to rotate structural frame 665 (and its contents) clockwise about journal 667 approximately 130 degrees. At that time station 600 will reflect the sealing position of FIG. 11.

An operator may then control station 600 to release the pressurized air in air bellows 675 in a controlled fashion to lower lift plate assembly 680 (and container 625) until lift plate assembly 680 may rest on guide blocks 684 and bottom surfaces of bar members 6806, 6807, 6808 and 6808 may rest on a top surface of structural frame 665. At that time station 600 will reflect the load/unload position of FIG. 10. At that time, an operator may operate a fork lift or other means to unload container 625 from station 600 and prepare it for another container 625 filled with frozen food or other contents intended for discharging.

Figure 13:
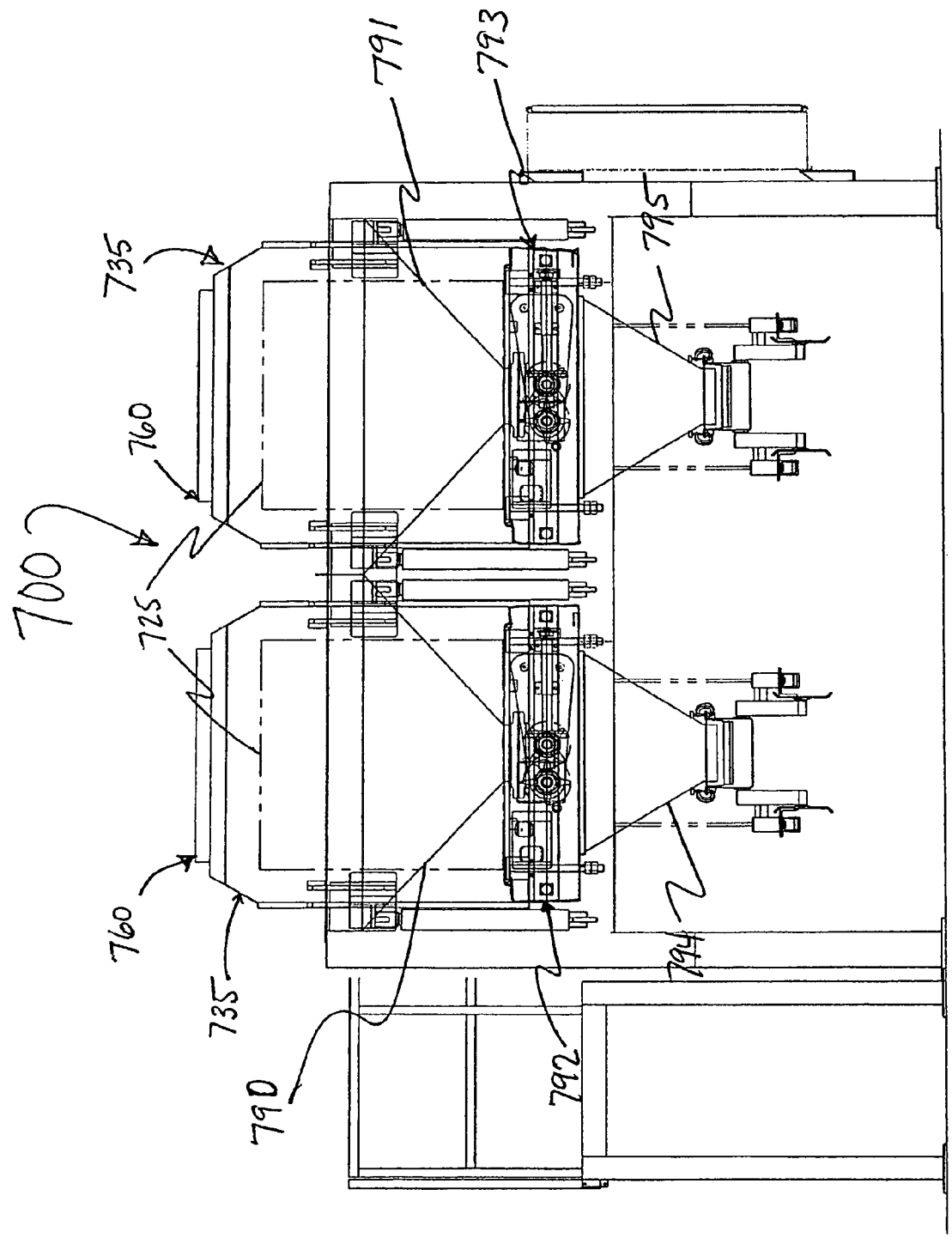
FIG. 13 illustrates a container-contents discharging station capable of discharging contents from two containers, each container supplying a distinct type of frozen vegetable to a mixed blend frozen vegetable supply system.

FIG. 13 illustrates of a mixed blend supply system 700 that discharges the contents of two separate containers 725. Each container 725 may have a different type of content, for example, when used to supply frozen food, contents of a first container 725 may be carrots and the contents of a second container 725 may be broccoli. When container-contents discharging station 700 rotates a container 725 into a discharge position as described above, the contents of container 725 may discharge into its associated hopper 790 or 791. A chunk-breaking device 792 or 793 receives the contents of hopper 790 and 791 respectively, and outputs smaller pieces to hoppers 794 and 795. At the bottom of hoppers 794 and 795, the contents may be metered onto a conveyer operating beneath each hopper. Various configurations may be utilized wherein, for example, hoppers 794 and 795 provide their contents to rotary valves, vibratory bowls, vibratory conveyors, or similar devices. Existing container-contents discharging stations without guards and air bellows may be retrofitted.

A method of retrofitting container-contents discharging stations includes unbolting or otherwise removing the enclosure and/or structural frame from the means to rotate the structural frame (and its contents). The top edges of the walls of the enclosure may be adapted to accommodate container height and to facilitate the addition of one or more guard plates to the enclosure walls. A centrally located air bellows or hydraulic or airlift cylinder as described above may be attached to the structural frame, and a lift plate including appropriate guide rods and hard stops and strengthening members as necessary, or an alternative scissor lift assist mechanism described below may be attached to the structural frame. This modified enclosure may then be reattached to the means for rotating the structural frame (and its contents), setting the hard stops or other means to limit motion (such as proximity switches) of the lift plate to an appropriate height, and connecting a supply of pressurized air and regulator to the air bellows or other lifting apparatus. Alternatively, a retrofit may be accomplished by removing the prior enclosure, installing a new enclosure with top guards, a lift plate, a plate lifting mechanism with associated air lines or hydraulic lines and power source, a lift guide assembly, and carton alignment members already installed on or with the enclosure, and then bolting or other wise attaching this new enclosure to the existing means to rotate. In a retrofit, one or more new or additional hydraulic cylinders may also be provided for the rotation assembly.

Figure 14:
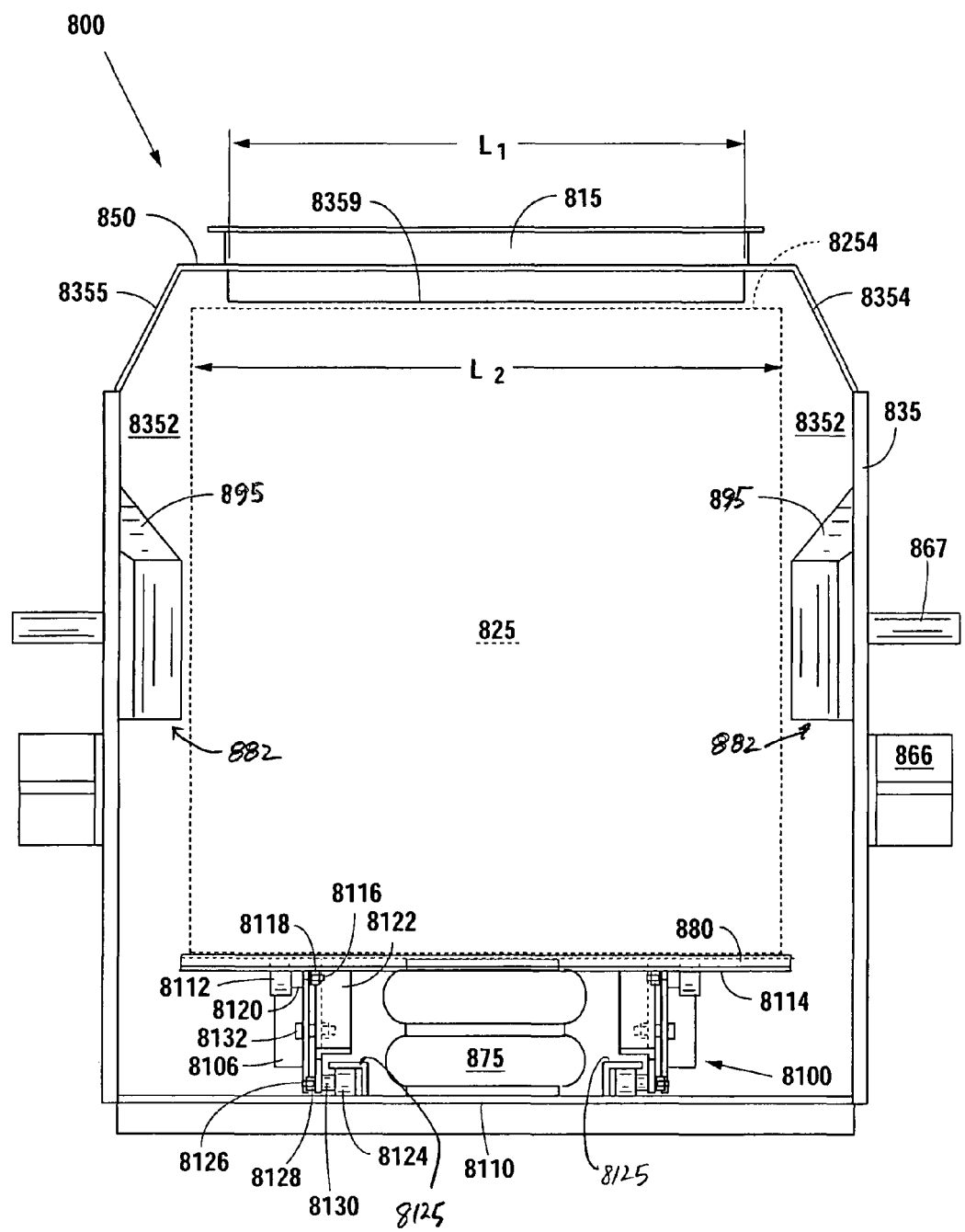
FIG. 14 is a rear elevation view of a container-contents discharging station according to some embodiments of the present invention with a container disposed between the alignment shoulders and resting on the lift plate in the "down" or "unsealed" position.
Figure 15:
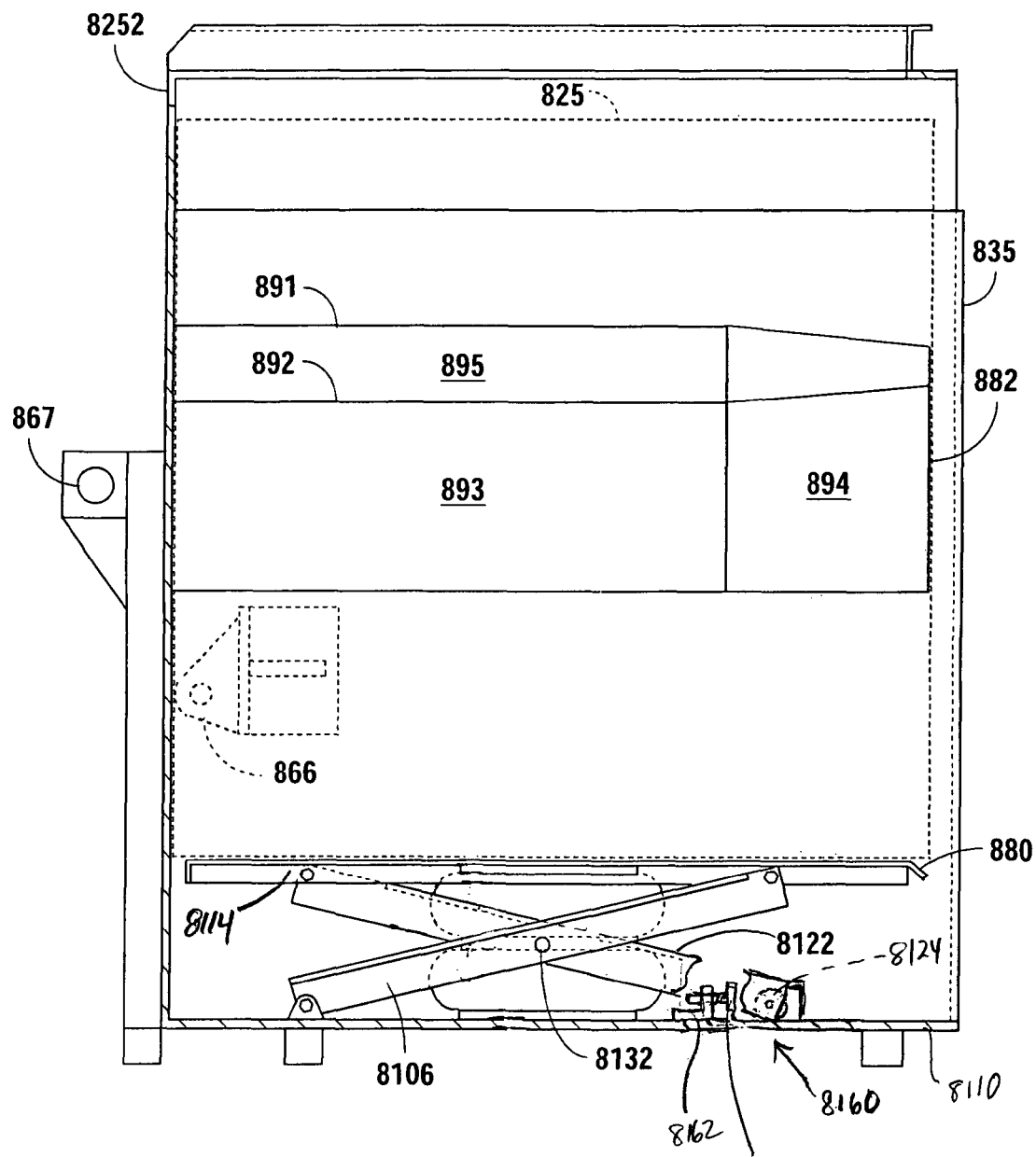
FIG. 15 is a side elevation view of the embodiment of FIG. 14 showing the scissor lift stabilizing mechanism in the down position.
Figure 16:
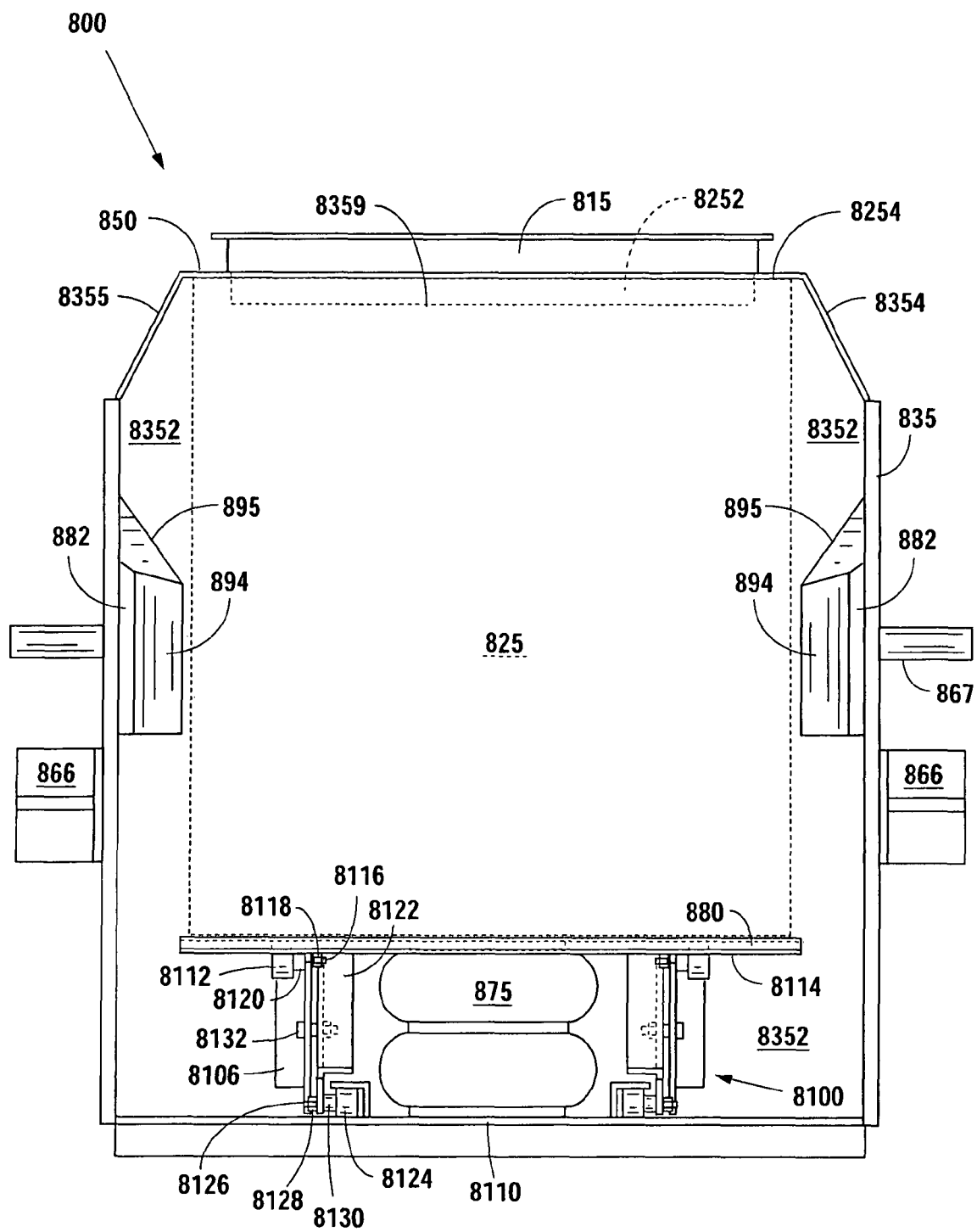
FIG. 16 is a rear elevation view of a container-contents discharge station of FIG. 14 with the container in the "raised" or "sealed" position.
Figure 17:
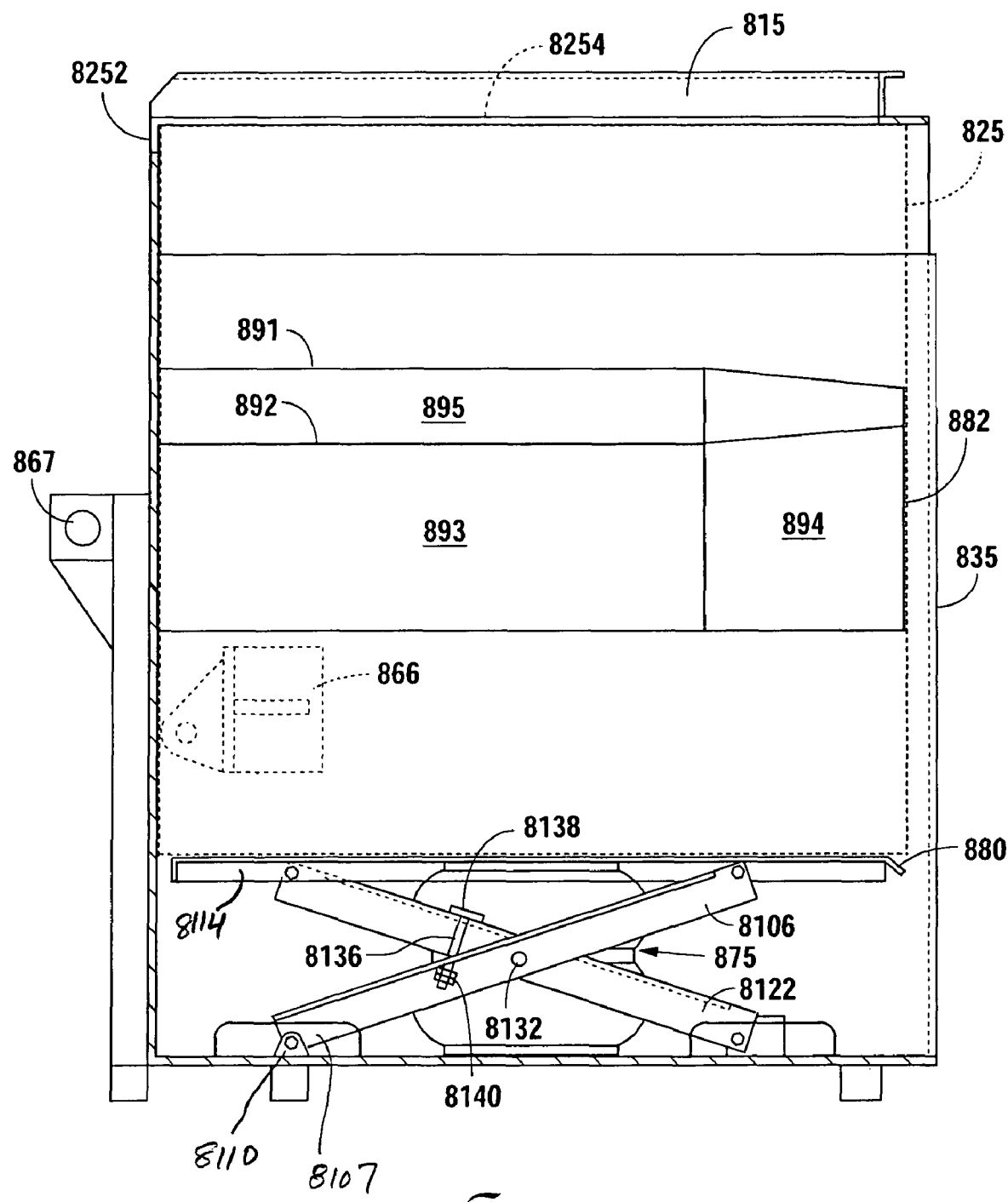
FIG. 17 is a side elevation view of FIG. 16.
Figure 18:
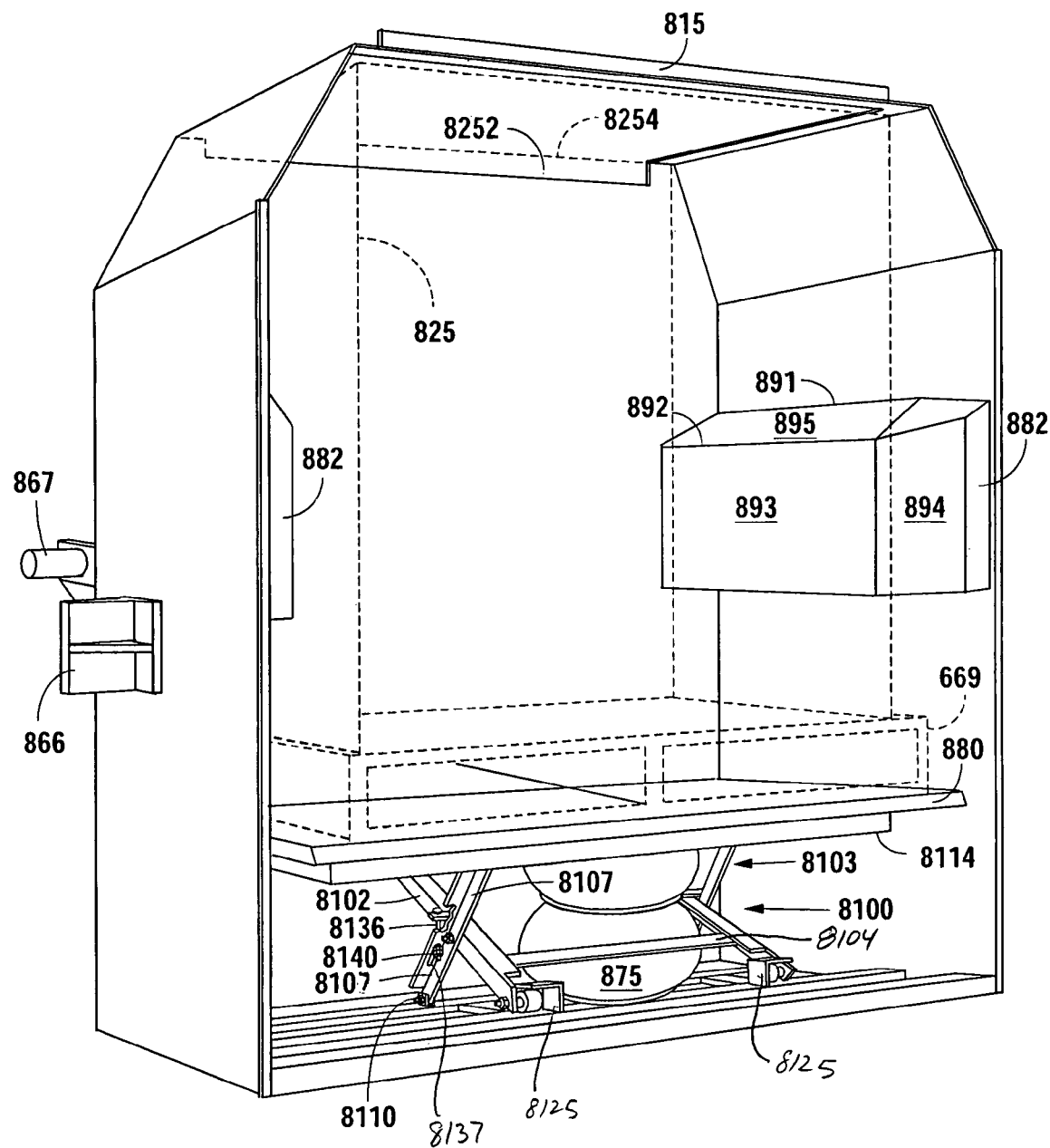
FIG. 18 illustrates a back perspective view of a container-contents discharge station according to some embodiments showing a container or carton in hidden or broken lines upon a pallet and disposed between the opposing container alignment shoulders. The container is in the raised position.

FIGS. 14-18 illustrate various perspective views of further embodiments of the present assembly. FIGS. 14 and 15 show the carton unlifted. FIGS. 16, 17, and 18 show the carton lifted. FIG. 19 is a simplified perspective showing the carton lifted with the front edge exposed. None of these figures illustrates a pallet beneath the container, but it should be understood that a pallet could be used by adjusting the stroke of the lifting mechanism.

Turning to FIG. 14, it may be seen that the container contents discharging station assembly 800 may be provided with additional features which enhance the sealing of the carton 825 within the enclosure 835 when the assembly 800 is rotated. FIG. 14 is a rear elevation view of assembly 800 with a carton 825 (in hidden lines) loaded within the space defined by the walls of the housing. FIG. 15 is a left side elevation view of the assembly 800 with the carton lowered. In FIG. 14, the carton 825 has not been raised to seal the three upper edges of the carton, i.e., the left side top edge, the rear side top edge 8254 or the right side top edge against the underside of the guard 850.

It should be observed in FIG. 14 that the front face wall 8352 of the housing 835 has been provided with an undercut section 8359 whereby a portion of the upper edge of the front face wall 8352 has been removed for a length of $L_1$, which is shorter than the length $L_2$ of the front wall 8252 of the carton 825. As will be understood more fully when the carton 825 is raised prior to rotation of the assembly 800, a portion of the front face wall 8252 and upper edge of the front carton will extend above this undercut while the remainder of the upper edge portions of the carton along the three other sides will seal against the underside of the guard 850. This will allow product to flow directly out of the top of the carton without restriction by any guard lip. The urging of the front wall of the carton against the front wall of the housing effectively seals the front side from debris falling into the hoppers.

Next, FIGS. 14 and 15 illustrate that the carton 825 rests securely on the base plate 880 with bellows 875 or like lifting devices attached to lift the plate (and the carton) to cause engagement of the upper edge portions of the carton along at least three side walls to seal at guard 850 when the lifting device is activated. FIG. 16 is a rear elevation view of assembly 800 showing the bellows activated and showing the carton 825 raised and sealed against guard 850. The upper portion of the carton front face is shown extending above the undercut section of the front housing face. (Member 815 is a stiffener which has been affixed around the opening in the top of the housing to strengthen the guard.) FIG. 17 is a left side elevation view of the assembly 800 with the carton raised.

FIGS. 14 and 16 also illustrate a pair of opposing carton alignment shoulders 882 within the inner space of the housing 835. Alignment shoulders 882 facilitate the accurate loading of a carton into the housing. It has been found that when loading heavy cartons with a fork truck, the carton can be skewed when inserted into the housing. When the carton is raised or the housing rotated, the skewed carton may be damaged or result in faulty alignment at the dispensing stage.

FIG. 18 shows more structural details of the opposing shoulder guides 882. They are more narrowly tapered 894 near the open side of the housing where the carton is initially inserted. As the carton is urged forward, it encounters the gradually widened shoulders until it reaches a non-tapering straight sidewall portion 893 against which the carton is positioned. Since a similar opposing shoulder guide is disposed on the opposite wall of the enclosure, the carton fits between the flat (straight) non-tapering side wall portion. It is desired that the carton be fully inserted into the housing in a proper alignment, but this is not always easy to achieve. However, if the carton is not properly aligned, the carton will adjust to properly align as it slides forward as the assembly is initially rotated and will quickly be securely positioned between the alignment shoulders.

FIGS. 14, 16, and 18 also show that shoulders 882 are further designed to taper or slope downwardly along surface 895 from upper outer edge 891 of the shoulder to lower inner edge 892. This allows for material and debris which falls from the outer wall faces of the carton to be directed toward the bottom of the housing for easier removal after the carton has been removed or unloaded from the housing.

Likewise, the upper portions of the housing walls 8355 and 8354 also taper inwardly toward the interior of the housing so that when the assembly 800 is reversed rotated for unloading a carton, material and debris again is directed toward the bottom of the housing or enclosure for easy cleanup.

Another feature of the embodiment of assembly 800 is the incorporation of a base plate or platform stabilizer mechanism 8100. This stabilizer mechanism may be used with any plate lifting mechanism whether an air bellows, a hydraulic or air lift cylinder. Stabilizer 8100 is a scissor lift-assist to ensure the even, parallel lifting of the base plate 880 which supports the carton/pallet. As previously discussed regarding FIGS. 10, 10A and 11, other lift plate assembly stabilizer blocks may be employed. FIGS. 14-17 also illustrate the scissor lift-assist assembly with the air bellows lift 875. FIGS. 20 and 21 show the scissor lift-assist assembly with a hydraulic lift assembly 975.

FIG. 18 shows a partial perspective of the lift-assist 8100 with an air bellows lift 875. The scissor assist assembly utilizes two pairs of lift arms 8102 and 8103, which are connected by cross-tubes 8104. The pair of lift arms are located on opposite sides of the air bellows 875. Turning to FIGS. 14-18, it may be seen that the first pair of lift arms 8102 has an exterior arm member 8106 that is connected to a lowermost end 8107 thereof to the base plate 8110 (FIG. 17). The uppermost end of the first exterior arm has a cam 8112 follower connected thereto that is movable along the underside 8114 of the lift plate 880 (FIGS. 14 and 16). The cam follower is mounted on a stub journal 8816 that extends through a passage in the uppermost end of the exterior arm and is secured thereto by a fastener 8118 (FIGS. 14 and 16). A cam spacer 8120 may be positioned between the cam follower and the exterior arm.

The first pair of lift arms 8102 further has an interior arm 8122 (FIGS. 15 and 17) that is connected on an uppermost end thereof to the underside 8114. The interior arm may be bolted or otherwise connected to a bracket that is connected to the base plate 880. The lowermost end of the interior arm has a cam follower 8124 (FIGS. 14 and 16) connected thereto that is movable along the base plate 8110. The cam follower 8124 is mounted on a stub journal 8126 that extends through a passage in the lowermost end of the interior arm 8122 and is secured thereto by a fastener 8128. A cam spacer 8130 may be positioned between the cam follower and the interior arm. FIGS. 14, 16, and 18 illustrate a lower cam guide and retainer bracket 8125 affixed to the base plate 8110 to maintain cam 8124 in alignment. It should be understood that a similar upper cam guide and retainer bracket is affixed to the underside 8114 of plate 880 to maintain alignment of cam 8112 on the exterior arm 8106. The upper bracket is not shown in the figures for clarity purposes.

The exterior arm member 8106 and the interior arm member 8122 are pivotally connected at approximately the midpoint thereof by a pivot bolt 8132 and appropriate fasteners and washers. Thus the two arms of the first pair may move in an even scissor-like manner about the pivot bolt. This results in a more stable vertical lift of the base plate 880. In order to limit the amount of travel of the connected arms 8106 and 8122, a scissor stop mechanism is attached to the arms. In one embodiment, the exterior arm has a slot 8137 (FIGS. 18 and 20) formed therein. A stop bolt 8136 passes through a hole in a flange 8133 (FIG. 20) in the interior arm and is aligned through the slot 8137. The bolt 8136 has a large head 8138 (FIG. 17) which will not pull through the hole in the flange. Lock nuts 8140 (FIG. 17) are threaded on the distal end of the stop bolt on the underside of the slot 8137. By lengthening or shortening the placement of the locking nuts 8140 on the bolt 8136, the scissor arm can open only so far. The amount of scissor opening is used to ensure that the bellows 875 does not inflate too far or the hydraulic cylinder 975 (FIGS. 20 and 21) does not overextend and lift the platform 880 more than necessary to have the top of the carton seal against the underside of the guard at the top of the housing (see FIGS. 16 and 17).

FIG. 15 illustrates that an alternative stop mechanism 8160 may be employed. The interior scissor arm 8122 is shown broken away to reveal an angle member 8162 affixed to base plate 8110. Angle member 8162 is provided with a threaded adjustment screw 8164. By turning screw 8164, the distance of the screw head from the angle member may be varied. When the cam follower 8124 moves forward as the bellows expands, the cam follower may abut the head of screw 8164 and thereby limit the movement of the scissor arm. It should be understood that a similar alternative stop mechanism would be located on the opposite side of the scissor assembly to limit the movement of opposite cam follower.

Again, it should be understood from the figures (FIGS. 14, 16, 18, and 20) that the second pair of lift arms 8103 are constructed similar to the first set 8102 on the opposite side of the bellows 875 to effectively stabilize the smooth lifting of the platform 880 lifting the carton.

FIG. 19 is provided to illustrate and to clarify the arrangement of the carton 825 fitting inside the enclosure 835 with the top edge of three of the carton sides (left, rear, and right) urged up against the underside of the guard 850. The outer surface of front wall 8252 of the carton is pressed against the inner surface of the front wall 8352 as a result of the loading of the carton 825 into the enclosure by the fork lift. (The carton alignment guide shoulders are not shown in FIG. 19 for clarification purposes.) Therefore, the carton is sealed within the housing such that foreign material, dirt, debris, miscellaneous wood splinters from the pallet cannot flow into the product being dispensed when the assembly 800 is rotated.

Additionally, FIG. 19 illustrates how a modified enclosure 800 as described above with bearing journals 867 and lift yokes 866 may be used to retrofit existing container-content discharging stations. An existing station is retrofitted by disconnecting the existing enclosure bearing journals from its rotation/support bearings, then disengaging the existing rotation/lift cylinder from the cylinder yokes on the existing enclosure. The existing enclosure is removed and a modified enclosure 800, as shown in FIG. 19, is installed. The modified enclosure has its own bearing journals 867 and cylinder yokes 866, which are connected to the existing rotation/support bearings and rotation/lift cylinders, respectively. As previously discussed, modified enclosure 800 has all novel features described above. Power to activate the bellows or plate lift cylinder must be installed.

FIGS. 20 and 21 illustrate an alternative plate 880 lifting embodiment wherein a hydraulic or air cylinder 975 is attached to cross-bar 8104 and supported by base plate 8110. The cylinder 975 is attached to a fluid power source (not shown) which when activated extends the cylinder arm to lift the plate 880 via the scissor lift-assist assembly 8100 previously described.

It should be noted that while containers 125, 225, 325, 425, 625, 725, and 825 are generally illustrated as rectangular cross-sectioned containers, that containers of other cross sections and shapes (and sizes) may be used with the embodiments described herein. One skilled in the art will recognize that the shapes and sizes of various components of container-contents discharging stations consistent with embodiment described herein will need to be modified to accommodate containers of other shapes.

It should also be noted that while some embodiments described herein were described as for use in conjunction with discharging frozen food, that a container-contents discharging station consistent with embodiments described herein may be used to discharge whatever specific contents may be in a container, particularly where it may be desired to prevent material external to the container from entering the product supply.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:
1. A container-contents discharging station rotatable about side journals from a first load/unload position to a second contents discharge position comprising:
a support frame;

three-sided enclosure affixed to said support frame defining a space for receiving an open top container therein, said side journals affixed to said support frame;

a generally "U" shaped guard plate coupled to the top of said enclosure and comprising a lip extending a predetermined amount into the interior of said enclosure such that top edges of three adjacent walls of said open top container, when received in said space, will abut an underside of said lip;

a pair of container alignment shoulders disposed on opposing interior walls of said enclosure, each of said alignment shoulders tapering from a narrow width at an open side of said enclosure to a wider, straight portion at a mid-section of said interior walls;

a support plate within said space for supporting said open top container movable by a lift mechanism to raise said container from an unsealed position to a sealed position with at least three top edges of said container abutted against said underside of said guard plate; and a support plate lift stabilizing mechanism affixed beneath said support plate and cooperating with said lift mechanism to raise said container to said sealed position, said stabilizing mechanism comprising opposing pairs of scissor arms pivotally attached at first ends to an underside of said support plate and a top side of a base plate and attached at second ends to cam followers movable within guide brackets from a first position to a second position when said lift mechanism is raised and a travel stop to limit the movement of said scissor arms.

* * * * *